United States Patent
Okazaki

(10) Patent No.: US 8,077,787 B2
(45) Date of Patent: Dec. 13, 2011

(54) COMMUNICATION CONTROL METHOD, RECEIVING STATION APPARATUS, TRANSMITTING STATION APPARATUS, AND COMMUNICATION SYSTEM

(75) Inventor: Akihiro Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 687 days.

(21) Appl. No.: 12/159,859

(22) PCT Filed: Jan. 31, 2006

(86) PCT No.: PCT/JP2006/301525
§ 371 (c)(1),
(2), (4) Date: Jul. 2, 2008

(87) PCT Pub. No.: WO2007/088580
PCT Pub. Date: Aug. 9, 2007

(65) Prior Publication Data
US 2009/0041105 A1    Feb. 12, 2009

(51) Int. Cl.
*H04L 27/28* (2006.01)
(52) U.S. Cl. ...................................... 375/260
(58) Field of Classification Search .............. 375/260
See application file for complete search history.

(56) References Cited

U.S. PATENT DOCUMENTS

| | | | |
|---|---|---|---|
| 6,438,174 B1 | 8/2002 | Isaksson et al. | |
| 6,816,452 B1 | 11/2004 | Maehata | |
| 6,829,307 B1 | 12/2004 | Hoo et al. | |
| 2004/0005010 A1 | 1/2004 | He et al. | |
| 2004/0208253 A1* | 10/2004 | Joo | 375/260 |
| 2005/0013381 A1* | 1/2005 | Suh et al. | 375/260 |
| 2005/0180313 A1 | 8/2005 | Kim et al. | |
| 2006/0268675 A1* | 11/2006 | Cho et al. | 370/210 |
| 2007/0092013 A1* | 4/2007 | Cahn et al. | 375/260 |

FOREIGN PATENT DOCUMENTS

| | | |
|---|---|---|
| EP | 1 115 221 A1 | 7/2001 |
| EP | 1 538 802 A2 | 6/2005 |
| EP | 1 538 802 A3 | 6/2005 |
| JP | 9 18433 | 1/1997 |
| JP | 2000-517513 | 12/2000 |
| JP | 2001 28577 | 1/2001 |
| JP | 2001-308861 | 11/2001 |
| JP | 2003-158500 | 5/2003 |
| JP | 2004 254335 | 9/2004 |
| JP | 2005-150945 | 6/2005 |

OTHER PUBLICATIONS

Extended European Search Report issued Dec. 27, 2010 in EP 06 71 2668.

(Continued)

*Primary Examiner* — Don N Vo
(74) *Attorney, Agent, or Firm* — Oblon, Spivak, McClelland, Maier & Neustadt, L.L.P.

(57) ABSTRACT

A receiving station apparatus controls a number of null carriers included in a transmission signal transmitted by a transmitting station apparatus in a communication system adopting a multicarrier modulation system to suppress inter-carrier interference by using the null carrier. For example, a reception-quality measuring unit measures a reception quality of a subcarrier group forming the transmission signal, and a number-of-null carriers determining unit determines the number of null carriers included in a next transmission signal based on the reception quality.

25 Claims, 27 Drawing Sheets

OTHER PUBLICATIONS

Jianfeng Qiang, et al., "An Efficient Multiple Access Scheme for Dynamic Subband Allocation in OFDMA System", 2005 IEEE International Symposium on Microwave, Antenna, Propagation and EMC Technologies for Wireless Communications Proceedings, vol. 2, XP010909612, Aug. 8, 2005, pp. 1046-1049.

Office Action issued Nov. 9, 2010, in Japanese Patent Application No. 2007-556720 with English translation.

Okazaki, Akihiro et al., "Frequency Domain Equalization of Multipath Signals with Insufficient Guard Interval", The Institute of Electronics, Information and Communication Engineers, p. 470, 2005, (with English translation).

Okazaki, Akihiro et al., "Adaptive Frequency Domain Equalization of Multipath Signals with Insufficient Guard Interval", Proceedings of the Society Conference of IEICE, p. 472, 2005, (with English translation).

Office Action issued Mar. 1, 2011, in Japan Patent Application No. 2007-556720 (with partial English translation).

* cited by examiner

RECEIVED SIGNAL (TRANSMISSION FORMAT #1)

RECEIVED SIGNAL (TRANSMISSION FORMAT #2)

RECEIVED SIGNAL (TRANSMISSION FORMAT #3)

RECEIVED SIGNAL (TRANSMISSION FORMAT #4)

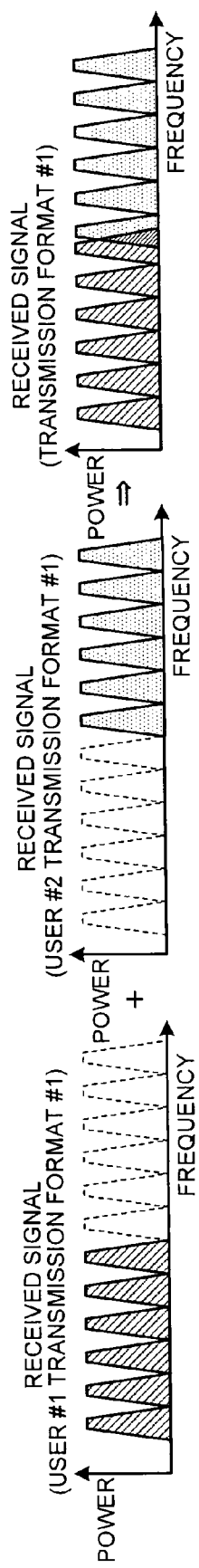

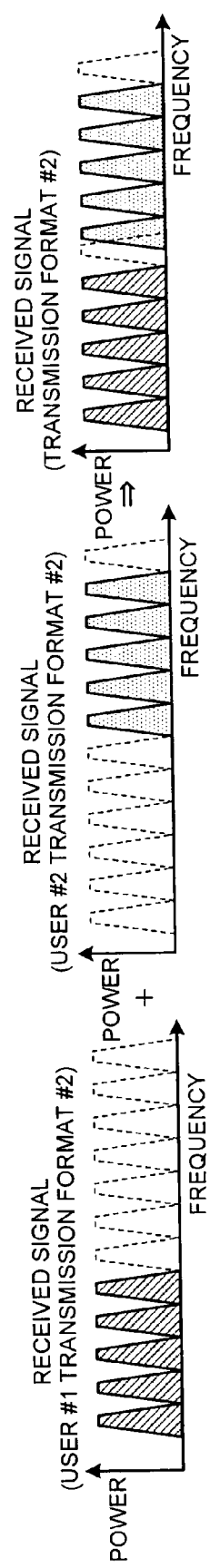

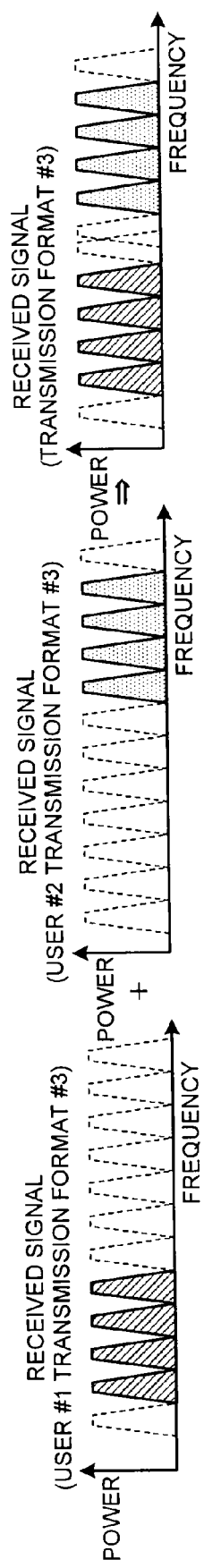

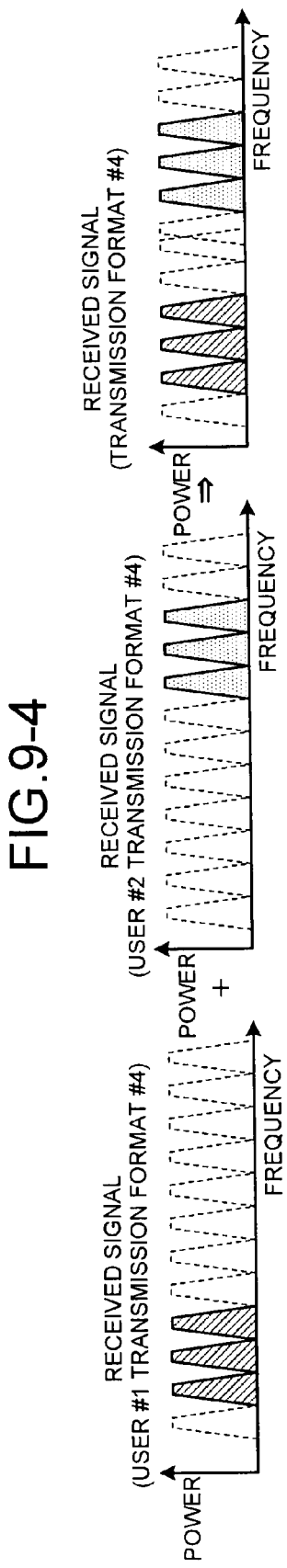

USER #1 TRANSMISSION FORMAT #1

USER #1 TRANSMISSION FORMAT #2

USER #1 TRANSMISSION FORMAT #3

USER #1 TRANSMISSION FORMAT #4

USER #2 TRANSMISSION FORMAT #1

USER #2 TRANSMISSION FORMAT #2

USER #2 TRANSMISSION FORMAT #3

USER #2 TRANSMISSION FORMAT #4

USER #3 TRANSMISSION FORMAT #1

USER #3 TRANSMISSION FORMAT #2

USER #3 TRANSMISSION FORMAT #3

USER #3 TRANSMISSION FORMAT #4

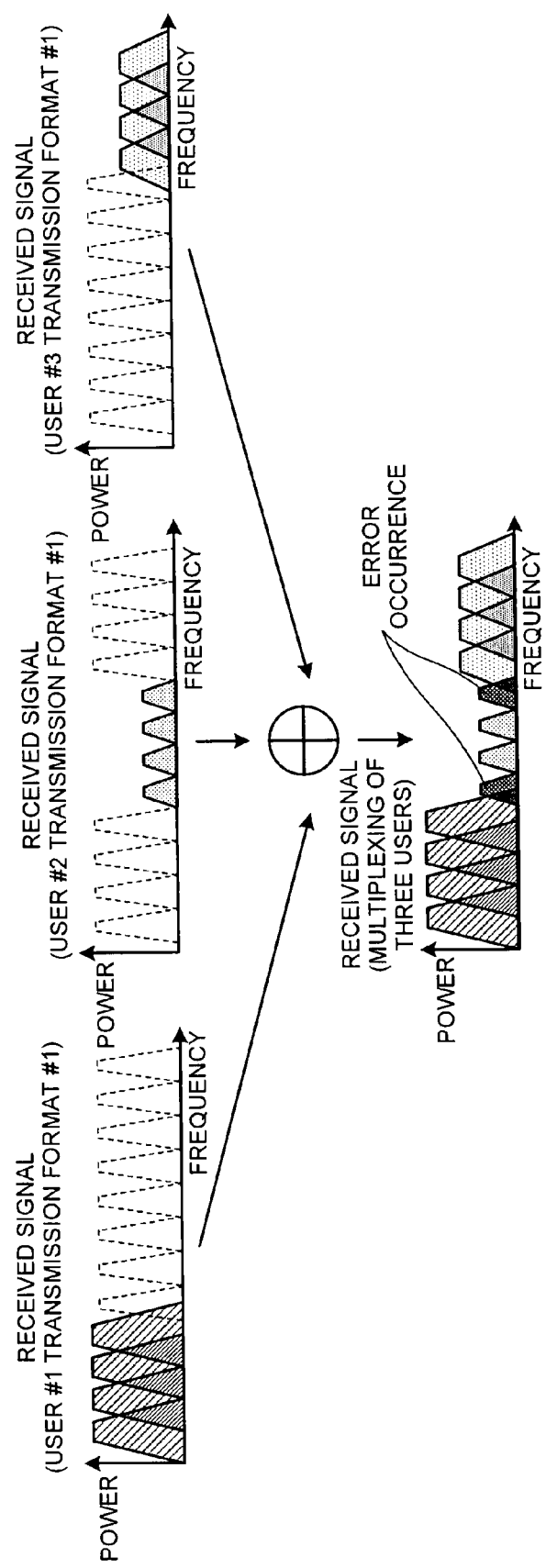

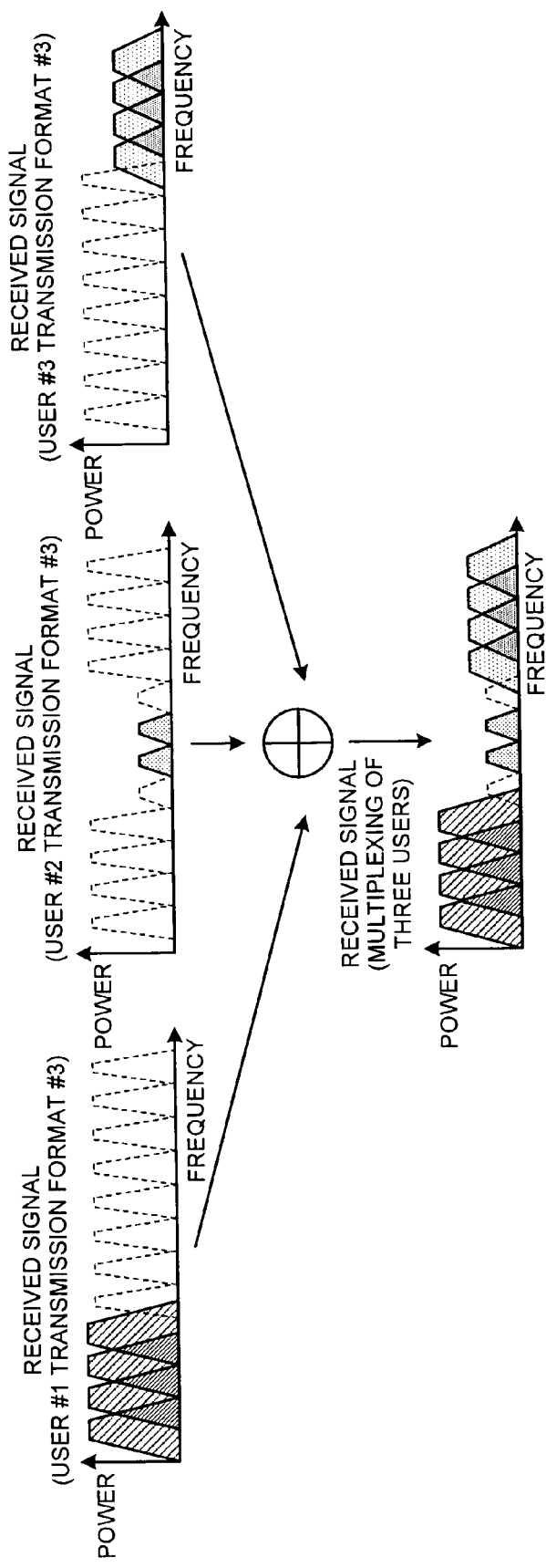

USER #1 TRANSMISSION FORMAT

USER #2 TRANSMISSION FORMAT

USER #3 TRANSMISSION FORMAT

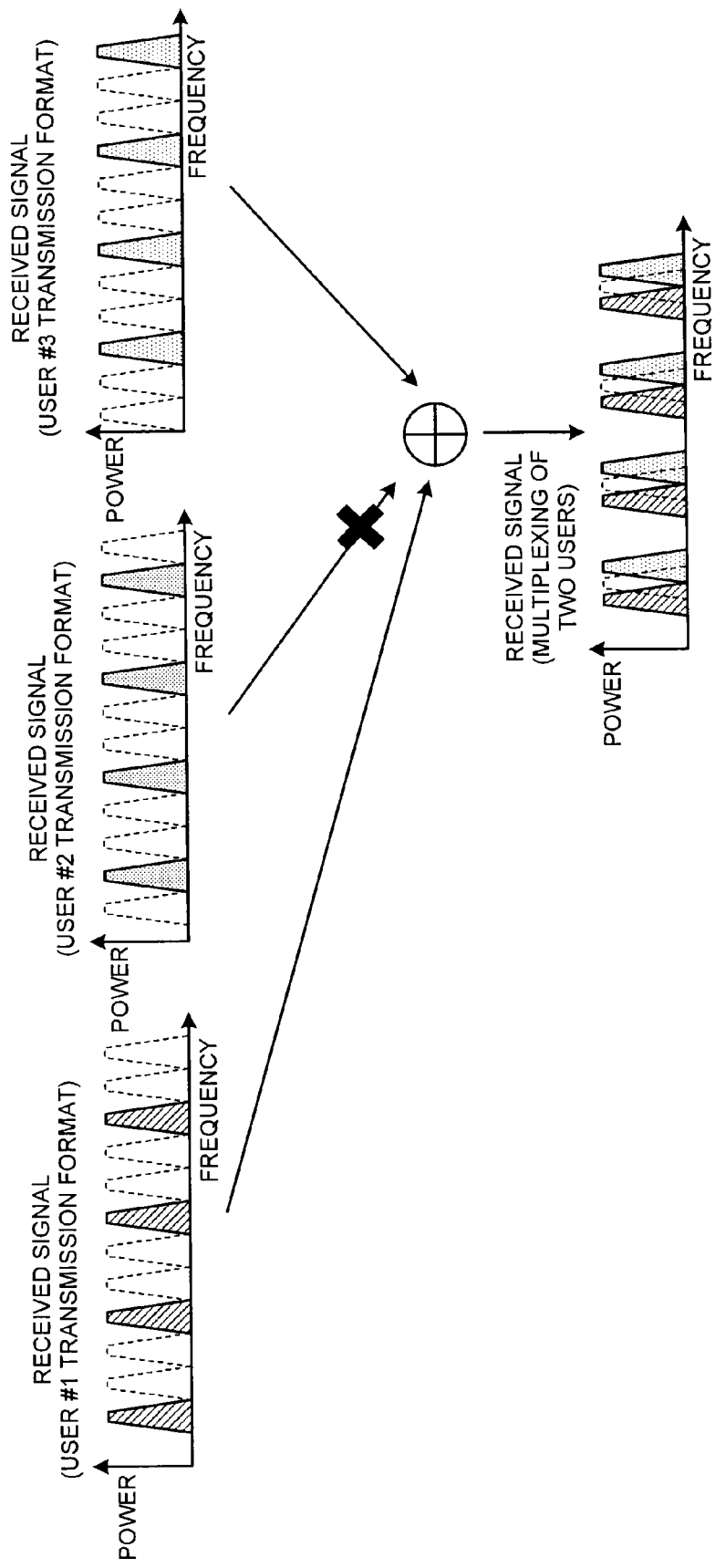

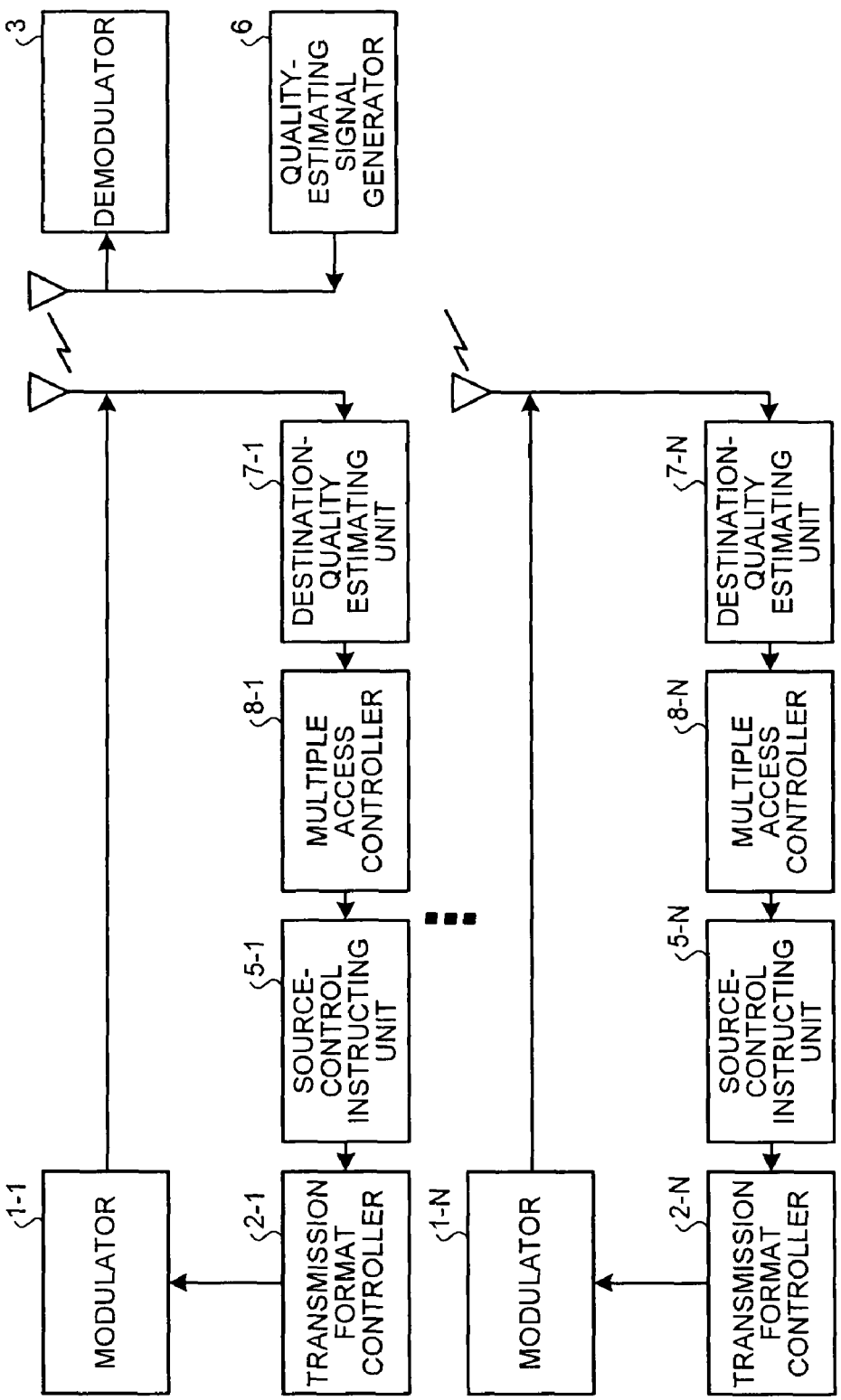

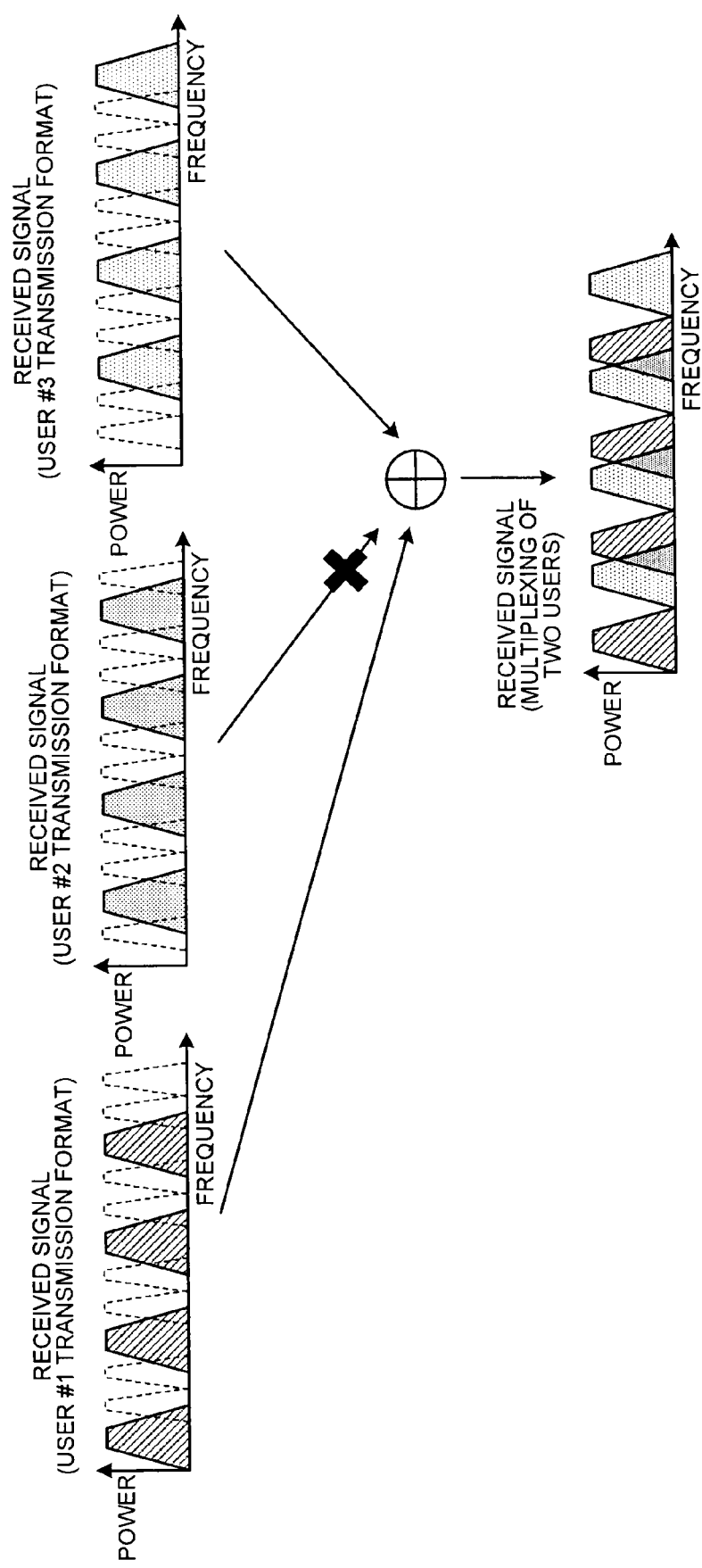

COMMUNICATION CONTROL METHOD, RECEIVING STATION APPARATUS, TRANSMITTING STATION APPARATUS, AND COMMUNICATION SYSTEM

TECHNICAL FIELD

The present invention relates to a communication control method corresponding to a multicarrier modulation system, and, more particularly to a communication control method for suppressing interference between subcarriers.

BACKGROUND ART

As a conventional wireless communication system, there are multicarrier modulation systems represented by, for example, OFDM (orthogonal frequency division multiplexing) and DMT (discrete multitone), and these systems are used for wireless LAN, ADSL, and the like. In these wireless communication systems, carriers are arranged orthogonal to a plurality of frequencies and transmitted. As a characteristic thereof, for example, these systems include a guard interval or a cyclic prefix as a function for removing an influence of delay waves generated due to a propagation path between transmitters and receivers. In the receiver, the influence of delay waves in the guard interval is removed by performing FFT with respect to an OFDM symbol, from which the guard interval is removed, to demodulate data accurately.

On the other hand, in the OFDM, when OFDM subcarriers are not completely orthogonalized due to a frequency offset, timing offset, or nonlinear distortion, the characteristic deteriorates.

Further, in the OFDM, in a state where delay waves with an insufficient guard interval arrive, intersymbol interference and inter-carrier interference occur, thereby largely deteriorating the characteristic. This problem can be solved by adding a guard interval longer than a presumed delay time in the transmitter. However, in this case, overhead of the guard interval increases, and transmission efficiency decreases.

In an orthogonal frequency division multiple access (OFDMA) uplink in which multiplexing is performed by orthogonalizing a plurality of user signals (data) by the OFDM, if frequency synchronization and signal synchronization between respective user signals are insufficient, inter-carrier interference occurs.

As one means for solving the above problems, for example, there is a method of suppressing inter-carrier interference by using a null carrier (subcarrier not power-transmitted) (see Patent Document 1 mentioned below).

According to Patent Document 1, a transmitting station avoid occurrence of interference by inserting the null carrier into a known subcarrier portion where interference with a subcarrier transmitted from another transmitting station occurs, to perform data transmission.

Patent Document 1: Japanese Patent Application Laid-open No. H9-18433

DISCLOSURE OF INVENTION

Problem to be Solved by the Invention

In the conventional system, however, although interference with other transmitting stations can be avoided, inter-carrier interference due to the frequency offset, timing offset, nonlinear distortion, or delay waves with an insufficient guard interval by the own station cannot be adjusted. Further, in the conventional system, the subcarrier position where the interference occurs needs to be known beforehand, and therefore an application thereof to a cellular system or a wireless LAN system is difficult. The conventional system cannot deal with inter-user interference in the OFDMA.

In view of the above circumstances, an object of the present invention is to obtain a communication control method capable of suppressing the inter-carrier interference and realizing data transmission with an excellent communication quality, under conditions where varying interference occurs (for example, conditions where interference occurs due to the inter-carrier interference due to the frequency offset, timing offset, nonlinear distortion, or delay waves with an insufficient guard interval, or the inter-user interference in the OFDMA).

Means for Solving Problem

To solve the above problems and to achieve the object, the present invention is characterized in that a communication control method in which a receiving station controls number of null carriers included in a signal (transmission signal) transmitted by a transmitting station in a communication system adopting a multicarrier modulation system to suppress inter-carrier interference by using the null carrier includes, for example, a reception-quality measuring step including the receiving station measuring a reception quality of a subcarrier group forming the transmission signal; and a number-of-null carriers determining step including the receiving station determining the number of null carriers included in a next transmission signal based on the reception quality obtained as a measurement result.

EFFECT OF THE INVENTION

According to the present invention, the receiving station controls the number of null carriers to be inserted into the subcarrier group forming the transmission signal, based on the reception quality of the signal transmitted from the transmitting station. Therefore, even under conditions where the subcarriers are not orthogonalized sufficiently, for example, when there is an influence of nonlinear distortions or when delay waves with an insufficient guard interval are received, occurrence of inter-carrier interference can be suppressed, and data transmission can be performed with an excellent communication quality.

BRIEF DESCRIPTION OF DRAWINGS

FIG. 2-1 is a transmission format example used by the system according to the first embodiment.

FIG. 2-2 is a transmission format example used by the system according to the first embodiment.

FIG. 2-3 is a transmission format example used by the system according to the first embodiment.

FIG. 2-4 is a transmission format example used by the system according to the first embodiment.

FIG. 3-1 is an example of a state of inter-carrier interference occurring in the system according to the first embodiment.

FIG. 3-2 is an example of a state of inter-carrier interference occurring in the system according to the first embodiment.

FIG. 3-3 is an example of a state of inter-carrier interference occurring in the system according to the first embodiment.

FIG. 3-4 is an example of a state of inter-carrier interference occurring in the system according to the first embodiment.

FIG. 4-1 is an example of a state of inter-carrier interference occurring in the system according to the first embodiment.

FIG. 4-2 is an example of a state of inter-carrier interference occurring in the system according to the first embodiment.

FIG. 4-3 is an example of a state of inter-carrier interference occurring in the system according to the first embodiment.

FIG. 4-4 is an example of a state of inter-carrier interference occurring in the system according to the first embodiment.

FIG. 8-1 is a transmission format example used by an OFDMA system in which a subcarrier is allocated to two users.

FIG. 8-2 is a transmission format example used by an OFDMA system in which a subcarrier is allocated to two users.

FIG. 8-3 is a transmission format example used by an OFDMA system in which a subcarrier is allocated to two users.

FIG. 8-4 is a transmission format example used by an OFDMA system in which a subcarrier is allocated to two users.

FIG. 8-5 is a transmission format example used by an OFDMA system in which a subcarrier is allocated to two users.

FIG. 8-6 is a transmission format example used by an OFDMA system in which a subcarrier is allocated to two users.

FIG. 8-7 is a transmission format example used by an OFDMA system in which a subcarrier is allocated to two users.

FIG. 8-8 is a transmission format example used by an OFDMA system in which a subcarrier is allocated to two users.

FIG. 9-1 is an example of a state of inter-carrier interference occurring when two users simultaneously transmit data.

FIG. 9-2 is an example of a state of inter-carrier interference occurring when two users simultaneously transmit data.

FIG. 9-3 is an example of a state of inter-carrier interference occurring when two users simultaneously transmit data.

FIG. 9-4 is an example of a state of inter-carrier interference occurring when two users simultaneously transmit data.

FIG. 10-1 is a transmission format example used by an OFDMA system in which a subcarrier is allocated to three users.

FIG. 10-2 is a transmission format example used by an OFDMA system in which a subcarrier is allocated to three users.

FIG. 10-3 is a transmission format example used by an OFDMA system in which a subcarrier is allocated to three users.

FIG. 10-4 is a transmission format example used by an OFDMA system in which a subcarrier is allocated to three users.

FIG. 10-5 is a transmission format example used by an OFDMA system in which a subcarrier is allocated to three users.

FIG. 10-6 is a transmission format example used by an OFDMA system in which a subcarrier is allocated to three users.

FIG. 10-7 is a transmission format example used by an OFDMA system in which a subcarrier is allocated to three users.

FIG. 10-8 is a transmission format example used by an OFDMA system in which a subcarrier is allocated to three users.

FIG. 10-9 is a transmission format example used by an OFDMA system in which a subcarrier is allocated to three users.

FIG. 10-10 is a transmission format example used by an OFDMA system in which a subcarrier is allocated to three users.

FIG. 10-11 is a transmission format example used by an OFDMA system in which a subcarrier is allocated to three users.

FIG. 10-12 is a transmission format example used by an OFDMA system in which a subcarrier is allocated to three users.

FIG. 11-1 is an example of a state of inter-carrier interference occurring when data of a specific user is transmitted by a subcarrier with a band expanded.

FIG. 11-2 is an example of a state of inter-carrier interference when respective users use a transmission format #3 to transmit data.

FIG. 12-1 is a transmission format example used by an OFDMA system in which a subcarrier is allocated to three users.

FIG. 12-2 is a transmission format example used by an OFDMA system in which a subcarrier is allocated to three users.

FIG. 12-3 is a transmission format example used by an OFDMA system in which a subcarrier is allocated to three users.

FIG. 13-1 is an example of a state of inter-carrier interference when a base station has received data of a plurality of users.

FIG. 13-2 is an example of a state of inter-carrier interference when a base station has received data of a plurality of users.

FIG. 14 is a configuration example of the communication system according to a fifth embodiment.

FIG. 16-1 is a transmission format example used by an OFDMA system in which a subcarrier is allocated to three users.

FIG. 16-2 is a transmission format example used by an OFDMA system in which a subcarrier is allocated to three users.

FIG. 16-3 is a transmission format example used by an OFDMA system in which a subcarrier is allocated to three users.

FIG. 17-1 is an example of a state of inter-carrier interference when the base station has transmitted data of a plurality of users.

FIG. 17-2 is an example of the state of inter-carrier interference when the base station has transmitted data of a plurality of users.

FIG. 22-1 is a transmission format example used by the system according to the tenth embodiment.

FIG. 22-2 is a transmission format example used by the system according to the tenth embodiment.

FIG. 22-3 is a transmission format example used by the system according to the tenth embodiment.

FIG. 22-4 is a transmission format example used by the system according to the tenth embodiment.

Figure 1:
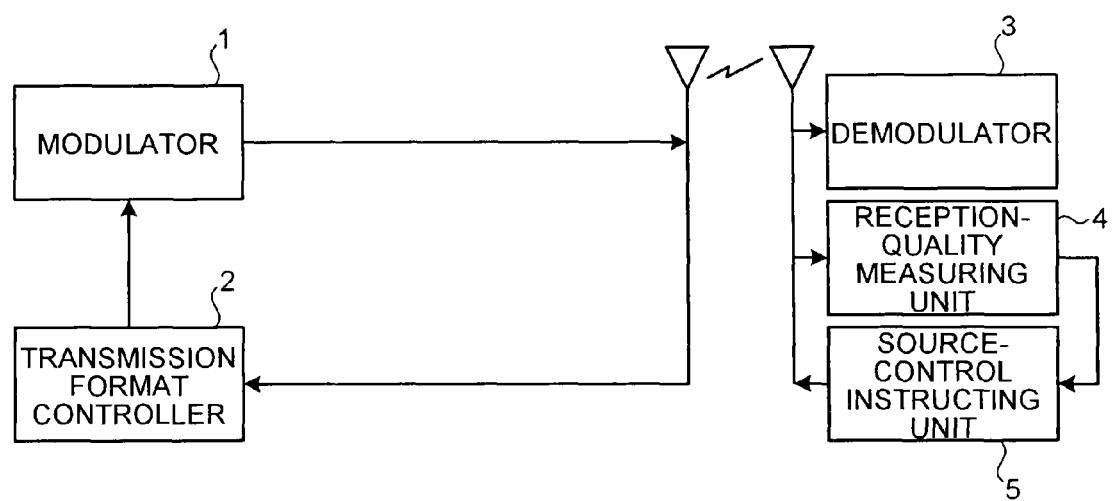
FIG. 1 is a configuration example of a communication system that realizes a communication control method according to a first embodiment of the present invention.

EXPLANATIONS OF LETTERS OR NUMERALS 1, 1-1, 1-N Modulator
2, 2-1, 2-N Transmission format controller
3, 3-1, 3-N Demodulator
4, 4-1, 4-N Reception-quality measuring unit
5, 5-1, 5-N Source-control instructing unit
6, 6-1, 6-N Quality-estimating signal generator
7, 7-1, 7-N Source-quality estimating unit
8, 8-1, 8-N Multiple access controller
9 Prior-estimated-quality output unit
10 Known-signal replica generator

BEST MODE(S) FOR CARRYING OUT THE INVENTION

Exemplary embodiments of a communication control method according to the present invention will be explained below in detail with reference to the accompanying drawings. Note that the present invention is not limited to the embodiments.

First Embodiment

FIG. 1 is a configuration example of a communication system that realizes a communication control method according to a first embodiment, and is a configuration example of an OFDM system that performs one-to-one two-way communication. The communication system includes a transmitting station apparatus (hereinafter, "transmitting station") including a modulator 1 and a transmission format controller 2, and a receiving station apparatus (hereinafter, "receiving station") including a demodulator 3, a reception-quality measuring unit 4, and a source-control instructing unit 5. Although not shown, the transmitting station and the receiving station include a module for performing a transmission process and a reception process for performing a transfer process of a signal, and transfer a user signal (data), a source-control instructing signal, a reception quality signal, or the like described later. This applies to the transmitting station and the receiving station in the following embodiments.

The modulator 1 in the transmitting station generates a transmission signal in which subcarriers are arranged according to a transmission format indicated by a transmission format signal output from the transmission format controller 2. The transmission format controller 2 selects a transmission format according to the source-control instructing signal received from the receiving station, and outputs the transmission format signal indicating the selected transmission format.

The demodulator 3 in the receiving station demodulates the signal received from the transmitting station via an antenna. The reception-quality measuring unit 4 measures a reception quality of the received signal (subcarrier). The source-control instructing unit 5 operating as a number-of-null carriers determining unit in claim 15 determines the transmission format used by the transmitting station at the time of transmitting data to the receiving station next time, and generates the source-control instructing signal including information of the determined transmission format. The generated source-control instructing signal is transmitted to the transmitting station, and the transmitting station performs an operation according to the source-control instructing signal.

As the reception quality measured by the reception-quality measuring unit 4, received power, signal to noise ratio (SNR), carrier to interference ratio (CIR), error ratio, and channel quality indicator (CQI) can be considered. The receiving station can know a size of inter-carrier interference from the reception quality. As one example, the CIR is used here and explained. The reception-quality measuring units in other embodiments described later also measure the CIR as the reception quality; however, the received power, SNR, or the like can be used as well.

An operation example of the transmission format controller 2 is explained next with reference to FIGS. 2-1 to 2-4. FIGS. 2-1 to 2-4 are transmission format examples used by the system according to the first embodiment, and are four types of transmission formats, that is, transmission formats #1, #2, #3, and #4 in order from FIG. 2-1. In the respective formats, broken lines indicate a null carrier, which is the subcarrier not power-transmitted, and in the transmission format #1, the null carrier is not arranged. In the transmission format #2, the null carrier is arranged in an adjacent one subcarrier. In the transmission format #3, the null carrier is arranged in adjacent two subcarriers. In the transmission format #4, the null carrier is arranged in adjacent three subcarriers. The transmission format controller 2 selects the transmission format instructed by the source-control instructing signal notified from the source-control instructing unit in the receiving station from the four types of transmission formats.

An operation example in which the communication system according to the present embodiment suppresses interference occurrence at the time of transmitting data is explained next with reference to FIGS. 3-1 to 3-4. FIGS. 3-1 to 3-4 respectively depict an example of a state of inter-carrier interference occurring in the system according to the first embodiment, and depict states of inter-carrier interference occurring when the respective transmission formats are applied to data transmission under the same condition. The conditions shown in FIGS. 3-1 to 3-4 correspond to a case that a subcarrier band is expanded, for example, due to nonlinear distortion, thereby interfering with the adjacent subcarrier.

First, the reception-quality measuring unit 4 measures the CIR of the received signal as information indicating the size of the inter-carrier interference. The source-control instructing unit 5 then controls the number of the null carrier to be inserted into a subcarrier group forming the transmission signal for suppressing the inter-carrier interference. Specifically, a transmitting station as the source of the received signal determines the transmission format to be used at the time of transmitting the data next time, based on the size of the CIR measured by the reception-quality measuring unit 4. For example, the source-control instructing unit 5 compares the size of the measured CIR with a plurality of thresholds specified beforehand, to select the transmission format based on the comparison result. The source-control instructing unit 5 generates a source-control instructing signal including the information of the selected transmission format to instruct transmission by using the selected transmission format. In the examples shown in FIGS. 3-1 to 3-4, when the transmission format #3 or higher is used, the inter-carrier interference does not occur. Therefore, the source-control instructing unit 5 generates the source-control instructing signal to instruct use of the transmission format #3.

The transmission format controller 2 in the transmitting station selects the transmission format according to the received source-control instructing signal (selects the transmission format #3), and outputs a transmission format signal indicating the selected transmission format #3. The modulator 1 generates the transmission signal in which the subcarrier is arranged according to the transmission format #3 indicated by the transmission format signal output from the transmission format controller 2, to transmit the generated signal (data). By performing such an operation, for example, even when the subcarrier band is expanded, for example, due to the nonlinear distortion, occurrence of inter-carrier interference can be suppressed, thereby enabling to perform the data transmission with an excellent communication quality.

An operation example in which the communication system according to the present embodiment transmits data by suppressing occurrence of inter-carrier interference due to inter-code interference generated by an influence of the delay waves with an insufficient guard interval (GI), which is different from the example in which the subcarrier band is expanded, is explained next with reference to FIGS. 4-1 to 4-4. FIGS. 4-1 to 4-4 respectively depict an example of a state of inter-carrier interference occurring in the system according to the first embodiment, and depict a state of the inter-carrier interference occurring when the respective transmission formats are applied to data transmission under a condition where there is an influence of the delay waves. In the state shown in FIGS. 4-1 to 4-4, because the subcarrier band is expanded due to the influence of the delay waves with an insufficient GI, the inter-carrier interference occurs when the normal transmission format (corresponding to the transmission format #1) is used.

In the state shown in FIGS. 4-1 to 4-4, by performing the same operation as the one explained based on FIGS. 3-1 to 3-4, the source-control instructing unit 5 selects the transmission format #4 based on the size of the CIR measured by the reception-quality measuring unit 4 and instructs the transmitting station to use the selected transmission format #4. The transmitting station uses the transmission format #4 according to the instruction from the source-control instructing unit 5 to transmit data. By performing such an operation, even when the subcarrier band is expanded due to the influence of the delay waves with an insufficient GI, occurrence of inter-carrier interference can be suppressed, thereby enabling to perform data transmission with an excellent communication quality. When the transmission format #4 is used, an output of the subcarrier that actually performs the data transmission becomes zero in a center frequency of other subcarriers that perform the data transmission, and therefore inter-carrier interference does not occur.

An operation example in which a frequency domain equalizer with guard band (GB-FEQ), which is a technique for suppressing the delay waves with an insufficient GI, is applied to the communication system according to the present embodiment by using the null carrier is explained. The modulator in the receiving station that performs an equalizing process applying the GB-FEQ can be realized by using an equalizer indicated in, for example, "Frequency Domain Equalization of Multipath Signals with insufficient Guard Interval" (2005 Institute of Electronics, Information and Communication Engineers General Conference B-5-21). Specifically, the equalizer in the receiving station equalizes the frequency of the signal by using the GB-FEQ, which is transmitted by the transmitting station by inserting a guard band (GB), which is the null carrier that does not perform information transmission, instead of the GI between data subcarriers, thereby suppressing interference due to the delay waves with an insufficient GI.

Accordingly, when the equalizer using the GB-FEQ is used as the demodulator 3, the source-control instructing unit 5 does not select the transmission format in which inter-carrier interference is completely suppressed (there is no interference), but can select the transmission format in which inter-carrier interference suppressible by the GB-FEQ remains. For example, in the example shown in FIGS. 3-1 to 3-4, a case that the source-control instructing unit 5 selects the transmission format #2 is explained. When the transmission format #2 is used, inter-carrier interference superposed on the subcarrier remains. However, because six null carriers are arranged in the transmission format #2, these six null carriers can be used as GB in the GB-FEQ. Accordingly, the demodulator 3 can suppress the inter-carrier interference by performing the equalizing process using the GB-FEQ, thereby enabling to receive data modulated by the modulator 1 by using the transmission format #2, with an excellent communication quality and enabling to efficiently perform the data transmission.

Accordingly, in the present embodiment, the receiving station of the data selects a transmission format capable of suppressing inter-carrier interference based on the reception quality of the signal transmitted by the transmitting station, and instructs the transmitting station to transmit the data by using the selected transmission format. The transmitting station then controls the number of null carriers to be inserted into the subcarrier group forming the transmission signal. Accordingly, under conditions where the subcarriers are not sufficiently orthogonalized, such as when there is an influence of nonlinear distortion, or when delay waves with an insufficient guard interval are received, the occurrence of inter-carrier interference can be suppressed and data transmission can be performed with an excellent communication quality.

Because interference between transmission carriers of a channel estimation signal is suppressed, a highly accurate channel estimation result can be obtained.

Second Embodiment

Figure 5:
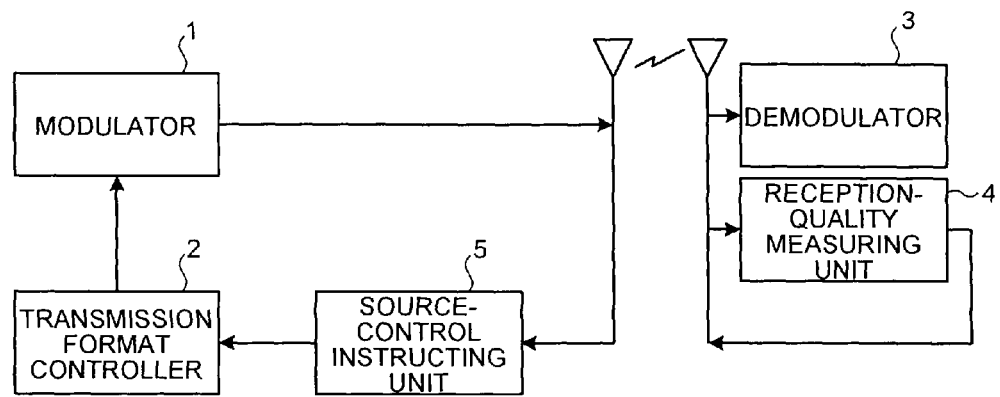
FIG. 5 is a configuration example of the communication system according to a second embodiment.

A second embodiment is explained next. FIG. 5 is a configuration example of the communication system according to the second embodiment, and is a configuration example of the OFDM system that performs the one-to-one two-way communication as in the first embodiment. The transmitting station of the communication system includes the modulator 1 and the transmission format controller 2, and further includes the source-control instructing unit 5, which is included in the receiving station of the communication system according to the first embodiment. On the other hand, the receiving station includes only the demodulator 3 and the reception-quality measuring unit 4. The source-control instructing unit 5 operates as a number-of-null carriers determining unit in claim 18.

In the communication system of the present embodiment, the receiving station transmits the reception quality measurement result of the signal measured by the reception-quality measuring unit 4 to the transmitting station. The source-control instructing unit 5 in the transmitting station determines the transmission format used by the transmitting station at the time of transmitting the data to the receiving station next time based on the reception quality measurement result received from the receiving station, and outputs the source-control instructing signal as a control signal for notification, including the determined transmission format to the transmission format controller 2. The operation in other parts is the same as that in the first embodiment.

In the present embodiment, the receiving station of the data transmits the reception quality measurement result of the signal transmitted by the transmitting station to the transmitting station. The transmitting station selects the transmission format capable of suppressing the inter-carrier interference and transmits the data by using the selected transmission format. Accordingly, the number of null carriers to be inserted into the subcarrier group forming the transmission signal is controlled. Consequently, even under conditions where the subcarriers are not orthogonalized sufficiently, for example, when there is an influence of nonlinear distortions or when delay waves with an insufficient guard interval are received, occurrence of inter-carrier interference can be suppressed, and data transmission can be performed with an excellent communication quality.

Because interference between transmission carriers in the channel estimation signal is also suppressed, the highly accurate channel estimation result can be obtained.

Third Embodiment

Figure 6:
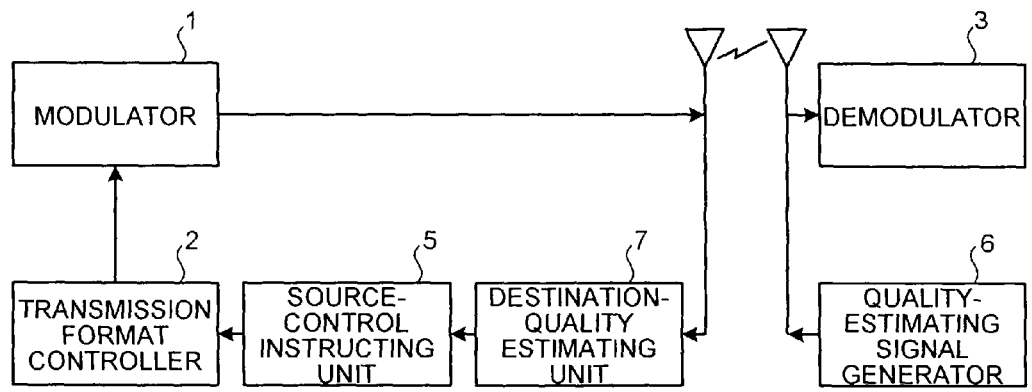
FIG. 6 is a configuration example of the communication system according to a third embodiment.

A third embodiment is explained next. FIG. 6 is a configuration example of the communication system according to the third embodiment, and is a configuration example of the OFDM system that performs the one-to-one two-way communication as in the first embodiment. The transmitting station in the communication system includes the modulator 1, the transmission format controller 2, and the source-control instructing unit 5 included in the receiving station in the communication system of the first embodiment, and further includes a destination-quality estimating unit 7 that operates as a reception-quality estimating unit in claim 20. On the other hand, the receiving station includes the demodulator 3 and a quality-estimating signal generator 6. The source-control instructing unit 5 operates as a number-of-null carriers determining unit in claim 20.

In the communication system of the present embodiment, the transmitting station estimates the reception quality of the signal in the receiving station, and determines the transmission format to be used by the transmitting unit at the time of next data transmission to the receiving station based on the estimation result. Specifically, the quality-estimating signal generator 6 generates a quality-estimating signal to be used by the transmitting station for estimating the reception quality of the signal in the receiving station, and the receiving station transmits the quality-estimating signal to the transmitting station.

The quality-estimating signal is explained. When the present embodiment is applied to a TDD (time division duplex) system, for example, the receiving station (quality-estimating signal generator 6) generates a signal having the same band as that of the signal transmitted from the transmitting station as the quality-estimating signal, and transmits the generated signal. When the present embodiment is applied to an FDD (frequency division duplex) system, for example, the receiving station transmits the signal received from the transmitting station as the quality-estimating signal by return. The same applies to the quality-estimating signal to be used in the following embodiments.

Next, the destination-quality estimating unit 7 in the transmitting station uses the received quality-estimating signal to estimate the reception quality of the signal in the receiving station. The source-control instructing unit 5 regards a quality estimation result by the destination-quality estimating unit 7 as a signal-reception quality measurement result in the receiving station to perform the same operation as that of the first embodiment, thereby determining the transmission format to be used at the time of next data transmission by the transmitting station. Other parts of the operation are the same as those of the first embodiment.

As described above, in the present embodiment, the transmitting station estimates the signal reception quality in the receiving station by using the quality-estimating signal transmitted by the receiving station to select the transmission format capable of suppressing the inter-carrier interference based on the estimated signal reception quality. The transmitting station transmits the data by using the selected transmission format, thereby controlling the number of null carriers to be inserted into the subcarrier group forming the transmitting signal. Accordingly, even under conditions where the subcarriers are not orthogonalized sufficiently, for example, when there is an influence of nonlinear distortions or when delay waves with an insufficient guard interval are received, occurrence of inter-carrier interference can be suppressed, and data transmission can be performed with an excellent communication quality.

Furthermore, because the source-control instructing signal and the reception quality signal to be transmitted from the receiving station to the transmitting station are not required, the information to be transmitted from the receiving station to the transmitting station can be reduced, and specifically, when the present embodiment is applied to the TDD system, the information to be transmitted from the receiving station to the transmitting station can be largely reduced.

Further, because interference between transmission carriers in the channel estimation signal is also suppressed, a highly accurate channel estimation result can be obtained.

Fourth Embodiment

Figure 7:
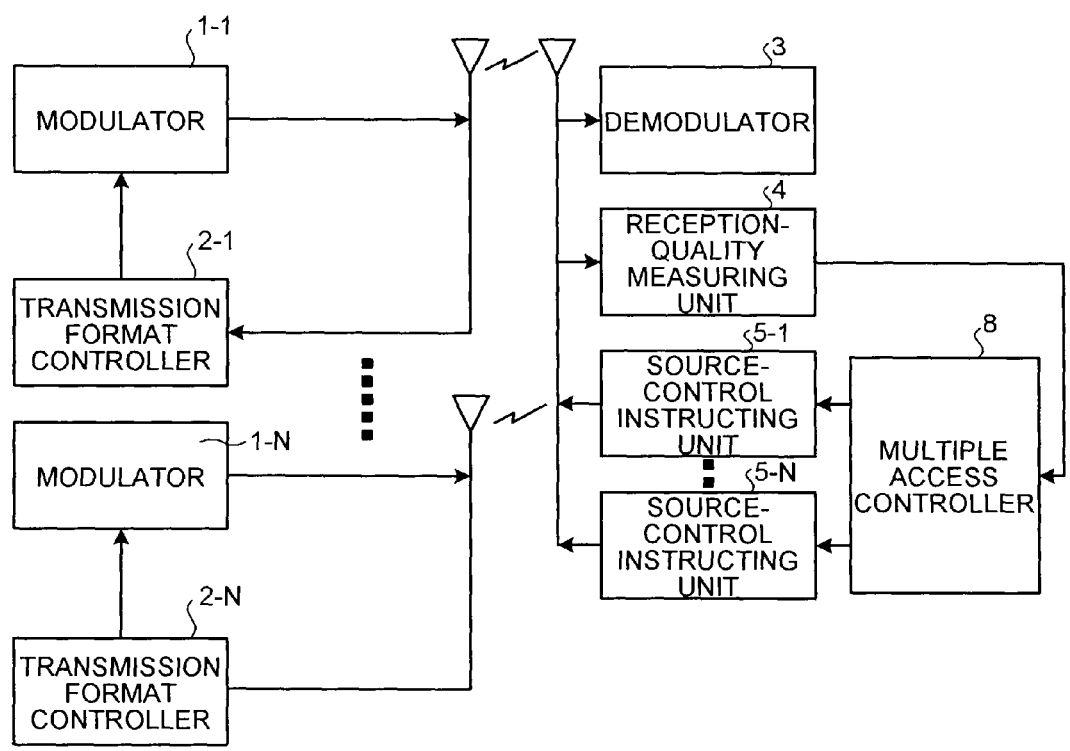
FIG. 7 is a configuration example of the communication system according to a fourth embodiment.

A fourth embodiment is explained next. FIG. 7 is a configuration example of a communication system of the fourth embodiment, and is a configuration example of an uplink system in an OFDMA system in which one-to-many two-way communication is performed, that is, a configuration example of the uplink system in the OFDMA system in which a plurality of mobile stations (transmitting stations) transmits data and one base station (receiving station) receives the data.

The respective mobile stations in this communication system include modulators (corresponding to modulators 1-1, ..., 1-N) and transmission format controllers (corresponding to transmission format controllers 2-1, ..., 2-N). The base station includes the demodulator 3, the reception-quality measuring unit 4 that operates as a reception-quality estimating unit in claim 16, source-control instructing units 5-1 to 5-N, and a multiple access controller 8 that operates as a number-of-null carriers determining unit in claim 16. Only parts different from the first embodiment will be explained below.

The reception-quality measuring unit 4 in the base station measures the reception quality of the signal received from the respective mobile stations. The multiple access controller 8 then determines the number of multiple accesses (the number of mobile stations permitted to perform data transmission) and subcarrier arrangement (subcarriers to be allocated to the respective mobile stations permitted to perform data transmission) based on the reception quality of the respective signals measured by the reception-quality measuring unit 4. The source-control instructing units 5-1 to 5-N determine the transmission format to be used at the time of next data transmission by the mobile station controlled, respectively, to generate the source-control instructing signal including the information. The source-control instructing signal includes information of the number of multiple accesses and the subcarrier positions determined by the multiple access controller 8 (information whether to permit transmission of the source-control instructing signal to a destination mobile station, and when the transmission is permitted, information of subcarriers to be allocated to the mobile station), in addition to the transmission format information. The base station transmits the generated source-control instructing signal to the respective mobile stations.

Figures 1, 8:
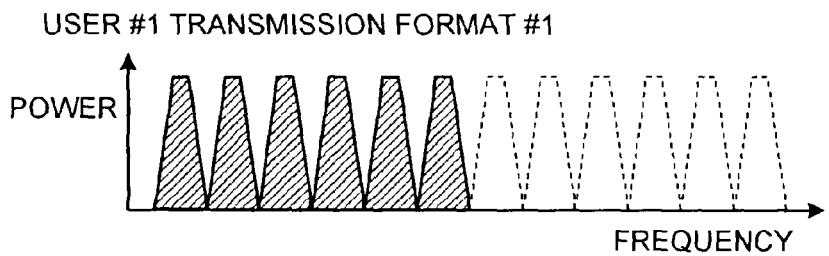
Figures 2, 8:
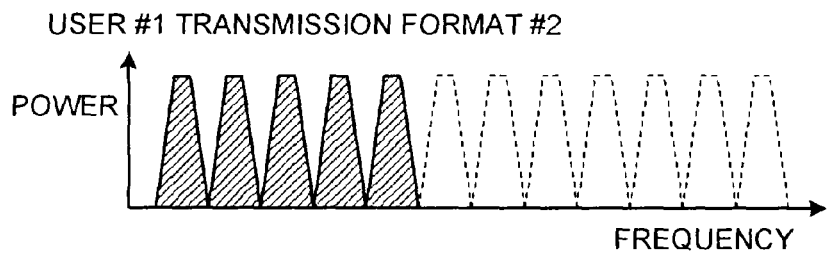
Figures 3, 8:
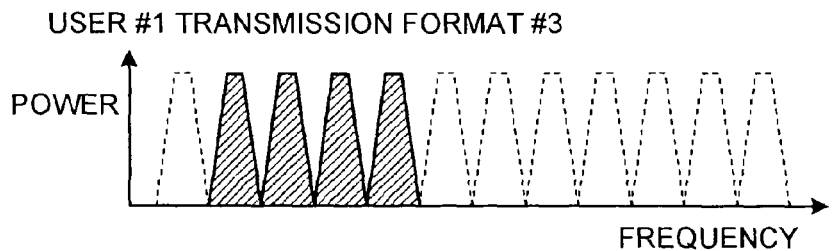
Figures 4, 8:
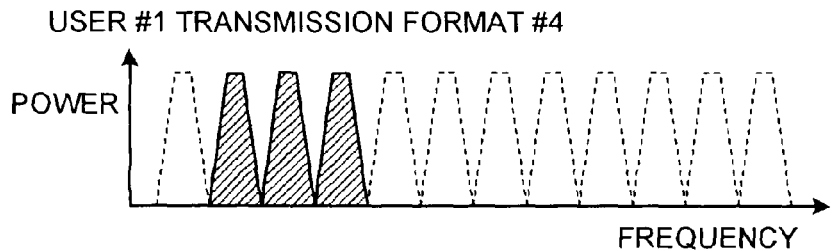
Figures 5, 8:
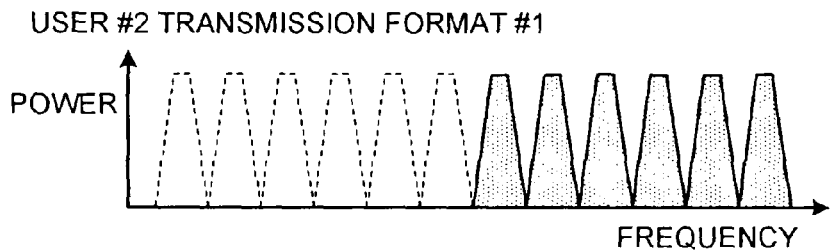
Figures 6, 8:
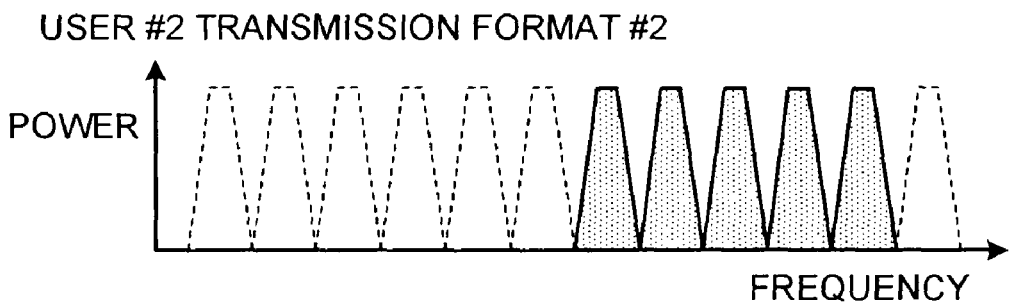
Figures 7, 8:
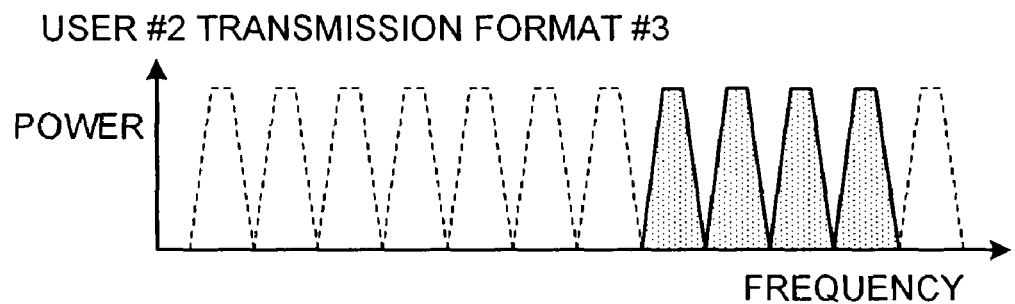
Figure 8:
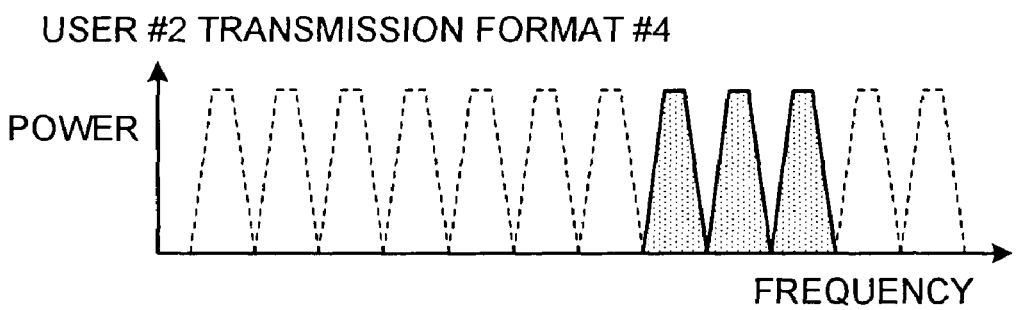

When the data transmission is permitted, the transmission format controller in the respective mobile stations having received the source-control instructing signal from the base station selects the subcarrier and the transmission format based on the information included in the source-control instructing signal. FIGS. 8-1 to 8-8 are transmission format examples used by the OFDMA system in which the subcarrier is allocated to two users (two mobile stations). FIGS. 8-1 to 8-4 depict the transmission format to be allocated to user #1 and FIGS. 8-5 to 8-8 depict the transmission format to be allocated to user #2. The system allocates six subcarriers to two users (users #1 and #2). The respective users (the transmission format controllers in respective mobile stations) select the transmission format from the transmission formats #1 to #4 based on the information included in the source-control instructing signal. In the transmission formats #1 to #4, 0 to 3 null carriers are allocated at the opposite ends of the subcarrier.

Figures 1, 10:
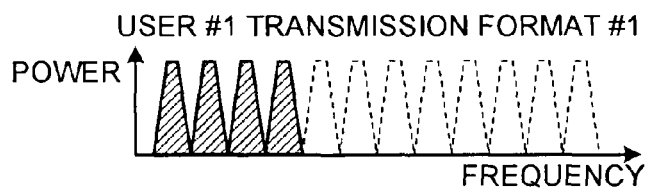
Figures 2, 10:
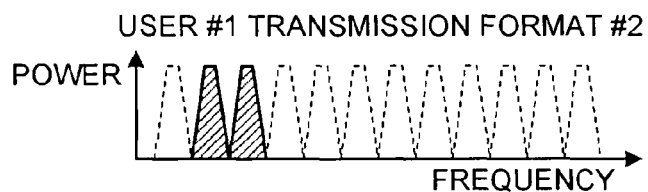
Figures 3, 10:
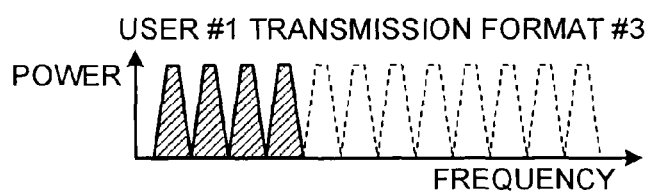
Figures 4, 10:
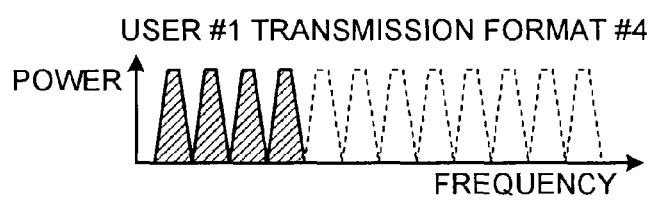
Figures 5, 10:
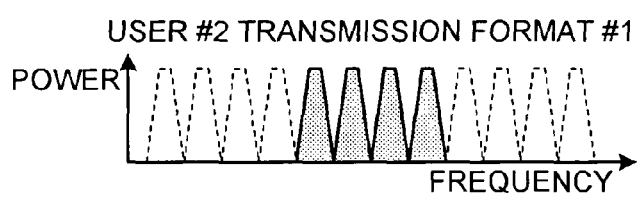
Figures 6, 10:
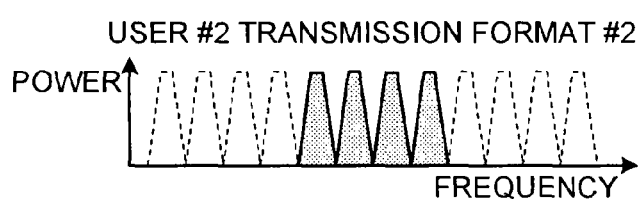
Figures 7, 10:
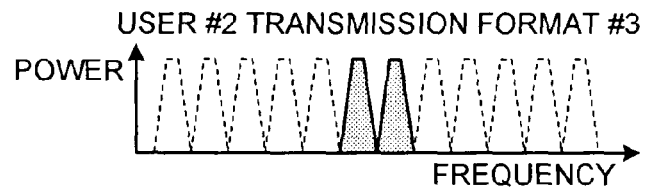
Figures 8, 10:
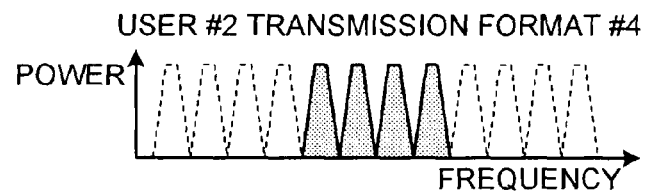
Figures 9, 10:
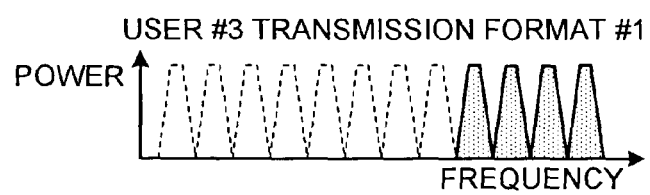
Figure 10:
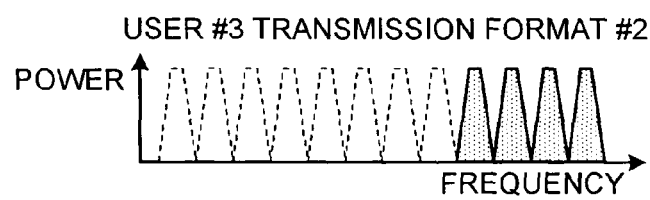

An operation example of the OFDMA system that uses the transmission formats as shown in FIGS. 8-1 to 8-8 is explained next with reference to FIGS. 9-1 to 9-4. FIGS. 9-1 to 9-4 respectively depict an example of a state of inter-carrier interference, which occurs when the two users simultaneously transmit data, and depict a state of inter-carrier interference, which occurs when the respective transmission formats are applied to the data transmission under the same configuration. In examples in FIGS. 9-1 to 9-4, because frequency synchronization of user #1 is insufficient, the subcarrier group shifts to the right and orthogonalization collapses at a boundary between the subcarrier groups of users #1 and #2. Accordingly, when users #1 and #2 perform the data transmission at the same time by using the normal transmission format (corresponding to the transmission format #1), inter-carrier interference occurs (see FIG. 9-1). The inter-carrier interference remains even when the frequency synchronization is corrected for each user to perform a demodulation process in the base station that has received the data.

To suppress occurrence of inter-carrier interference, the reception-quality measuring unit 4 measures, for example, the CIR as information indicating the size of inter-carrier interference. The source-control instructing units 5-1 to 5-N determine the transmission format to be used by the mobile station based on the size of the measured CIR, and instruct the mobile station to transmit the data by using the determined transmission format.

In examples shown in FIGS. 9-1 to 9-4, when the transmission format #2 or higher is used, because inter-carrier interference does not occur (see FIG. 9-2), the base station instructs the mobile stations corresponding to users #1 and #2 to use the transmission format #2. Users #1 and #2 use the transmission format #2 to transmit the data. The base station can suppress the inter-carrier interference and receive the data with an excellent communication quality by performing such an operation, for example, even when the frequency synchronization between users that simultaneously perform the data transmission is insufficient.

An operation example in which a plurality of users transmits data in the OFDMA system different from the examples shown in FIGS. 8-1 to 8-8 is explained next. FIGS. 10-1 to 10-12 are transmission format examples used by the OFDMA system in which the subcarrier is allocated to three users (three mobile stations). The system allocates four transmission subcarriers to three users (users #1 to #3). The respective users (the transmission format controllers in respective mobile stations) select the transmission format from the transmission formats #1 to #4 based on information included in the source-control instructing signal. It is assumed here that transmission formats #1 to #4 do not have the null carrier, and the null carrier is allocated to the opposite ends of the subcarrier of users #1, #2, and #3.

Figures 10, 11:
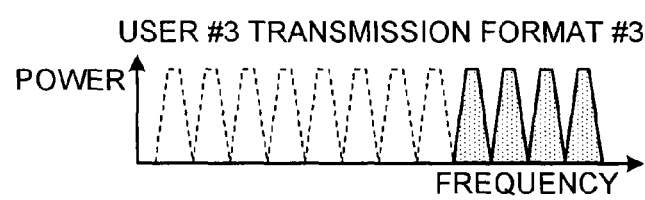

An operation example of the OFDMA system using the transmission format as shown in FIGS. 10-1 to 10-12 is explained with reference to FIGS. 11-1 and 11-2. FIG. 11-1 is an example of a state of inter-carrier interference, which occurs when data of a specific user is transmitted by the subcarrier whose band is expanded, and depicts a relation between a state before the data transmitted from the respective users are synthesized and a state after the data are synthesized. Such expansion of the band of the subcarrier occurs due to the nonlinear distortion. FIG. 11-1 depicts a state where the subcarrier of two users (user #1 and #3) are expanded and inter-carrier interference occurs.

To suppress the inter-carrier interference, the reception-quality measuring unit 4 measures, for example, the CIR as the information indicating the size of inter-carrier interference. The source-control instructing units 5-1 to 5-N determine the transmission format #3 (see FIGS. 10-3, 10-7, and 10-11), in which a subcarrier with the measured CIR being small is transmitted as the null carrier, as the transmission format used by respective users. FIG. 11-2 is an example of a state of inter-carrier interference when the respective users transmit data using the transmission format #3. FIG. 11-2 depicts that inter-carrier interference is suppressed and the base station can receive data with an excellent communication quality by using the transmission format #3 under a condition where inter-carrier interference as shown in FIG. 11-1 occurs.

Figures 10, 11, 12:
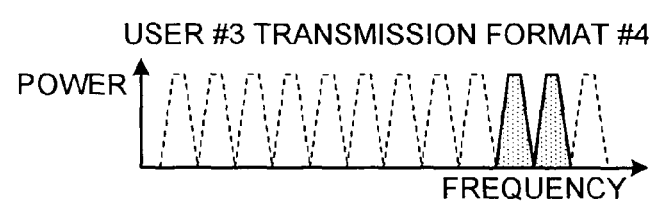
Figures 1, 12:
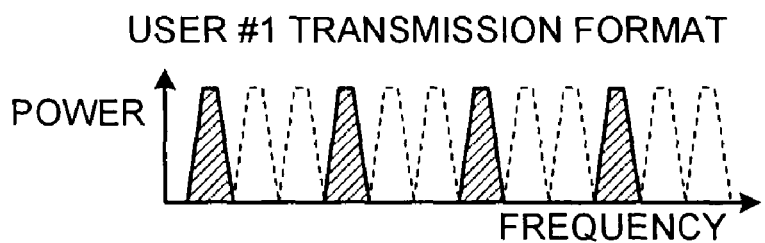
Figures 2, 12:
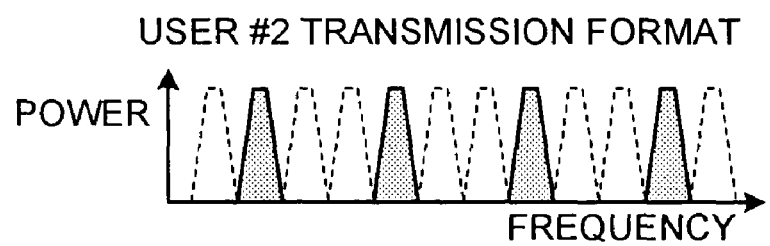
Figures 3, 12:
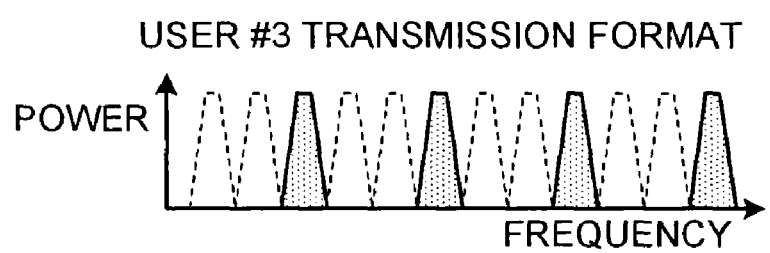

An operation of the multiple access controller 8 is explained next with reference to FIGS. 12-1 to 12-3 and FIGS. 13-1 and 13-2. FIGS. 12-1 to 12-3 are transmission format examples used by the OFDMA system in which the subcarrier is allocated to three users. This system allocates four transmission subcarriers to three users (users #1 to #3). It is assumed here that the transmission format is only one type for simplifying the explanation.

Figures 1, 2:
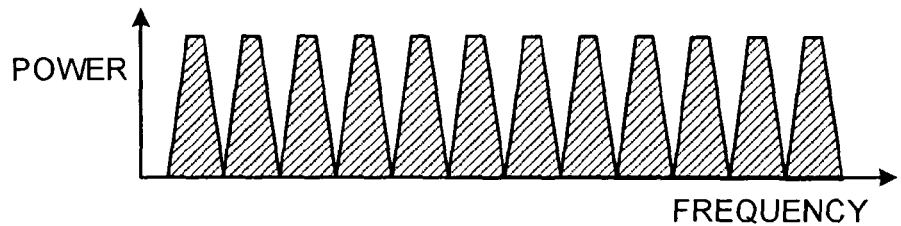
Figure 2:
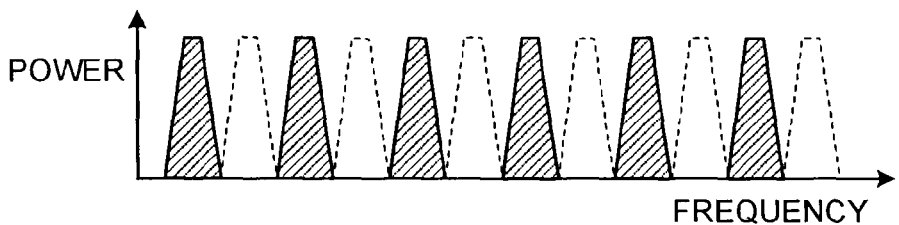
Figures 2, 3:
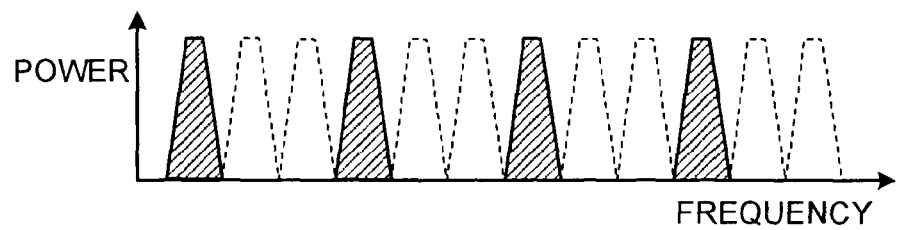
Figures 2, 3, 4:
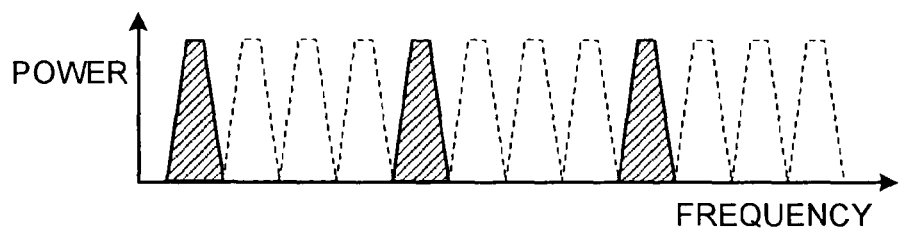
Figures 1, 3:
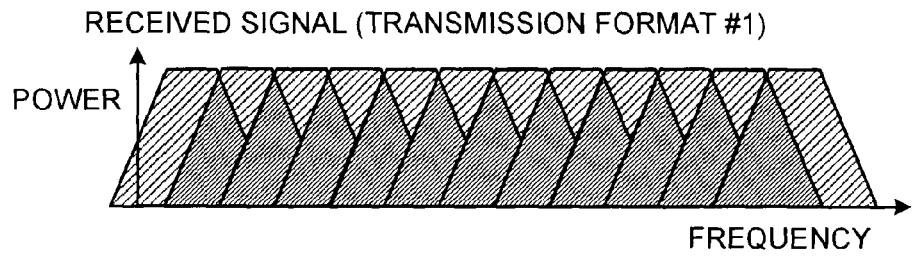
Figures 2, 3:
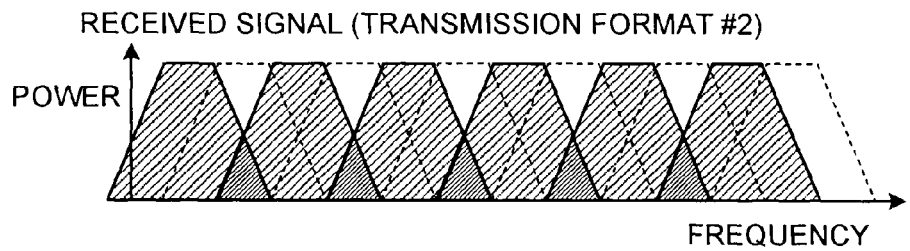
Figure 3:
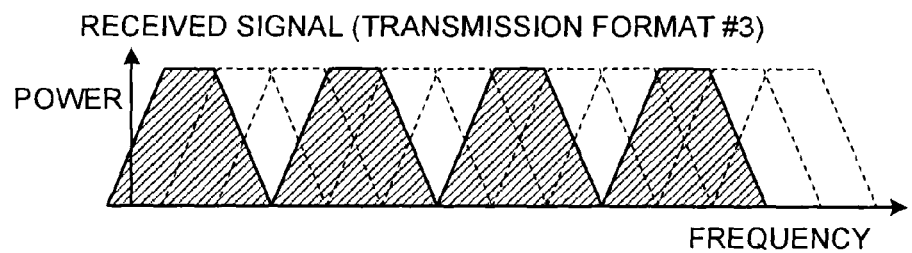
Figures 3, 4:
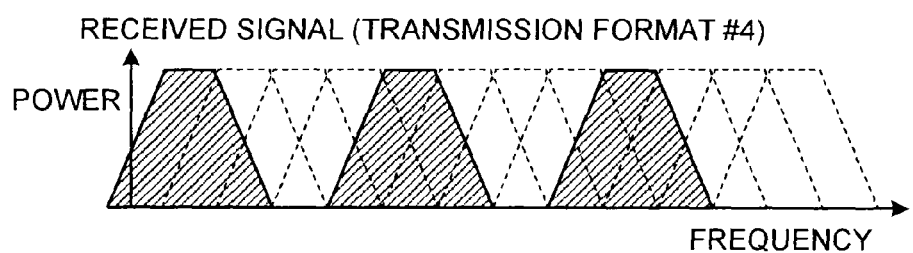
Figures 1, 4:
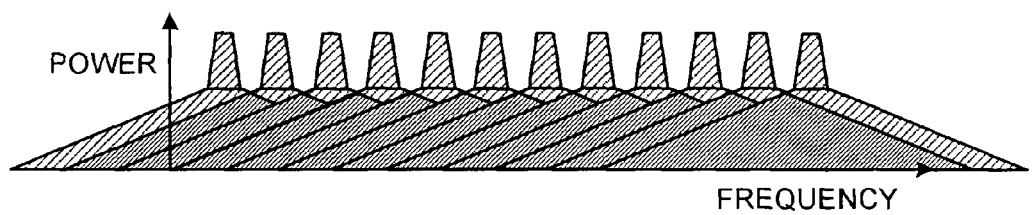
Figures 2, 4:
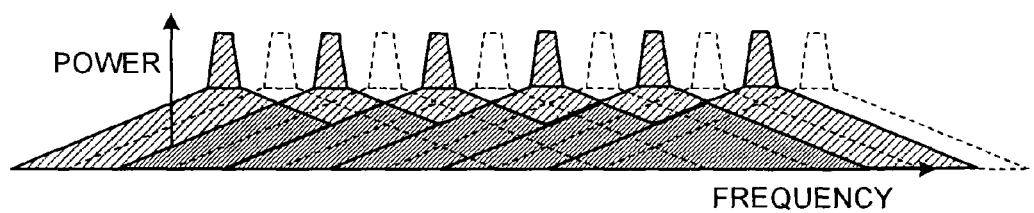
Figures 3, 4:
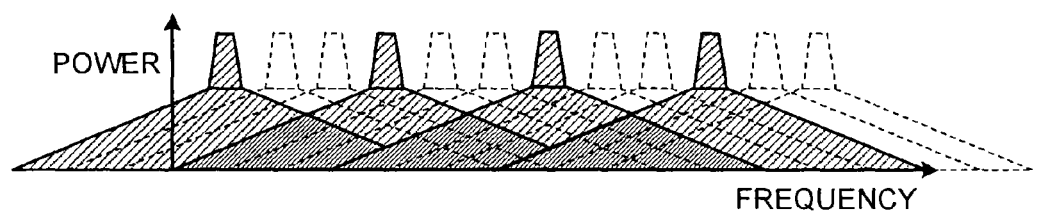
Figure 4:
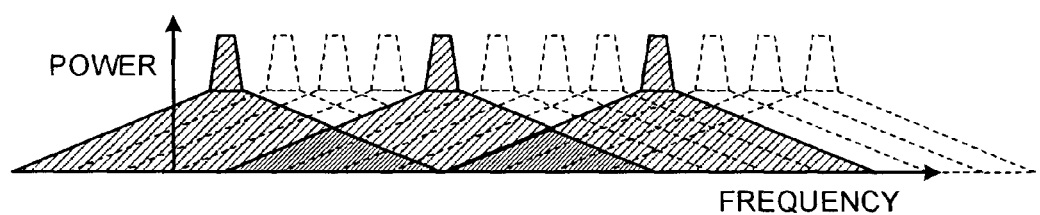
Figures 1, 13:
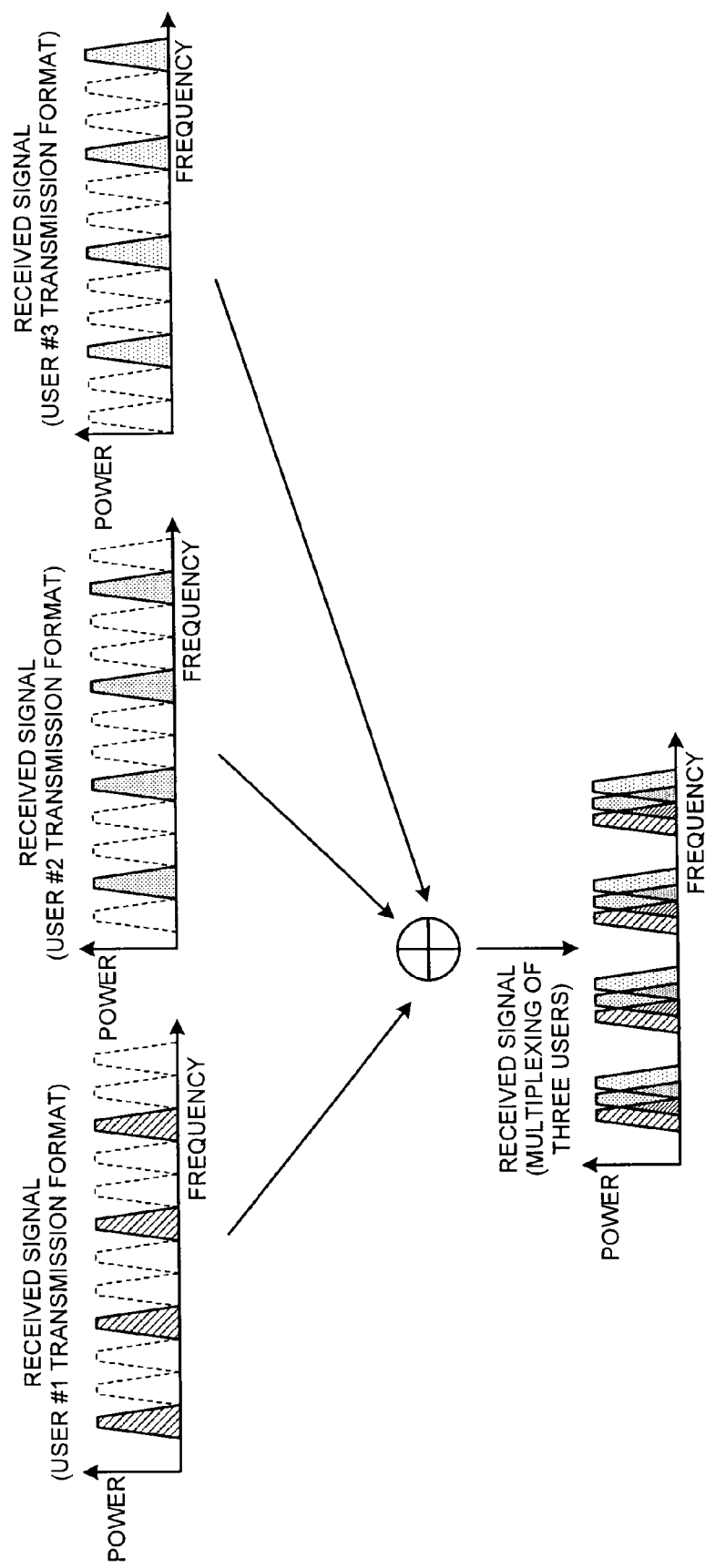

FIGS. 13-1 and 13-2 respectively depict an example of a state of inter-carrier interference when the base station has received data of a plurality of users, and depict a relation between a state before a plurality of subcarriers including a subcarrier of a user in which the frequency synchronization is insufficient are synthesized and a state after the subcarriers are synthesized. FIG. 13-1 depicts a state of inter-carrier interference when the base station has received data of three users and FIG. 13-2 depicts a state of inter-carrier interference when the base station has received data of two users by executing an operation described below to select the data.

In the states shown in FIGS. 13-1 and 13-2, the subcarrier group of user #1 shifts to the right, and the subcarrier group of user #3 shifts to the left. In this state, when the base station simultaneously receives data of these three users, interference occurs and receiving characteristics deteriorate (see FIG. 13-1). Therefore, the multiple access controller 8 performs user allocation based on the size of the CIR measured by the reception quality measuring unit 4 so that the inter-carrier interference does not occur. Specifically, the multiple access controller 8 suppresses the inter-carrier interference by allocating the subcarrier only to users #1 and #3 (see FIG. 13-2). Further, the multiple access controller 8 allocates the subcarrier to each user based on the size of the CIR, thereby enabling to obtain a multi-user diversity effect, and the base station can receive data with an excellent communication quality.

As described above, in the present embodiment, the base station performs centralized control based on the reception quality of a signal from each user, thereby determining the number of multiple accesses, the subcarrier arrangement, and the transmission format (the number of null carriers to be inserted into the subcarrier group forming the transmission signal). Accordingly, even under conditions where the respective users and the subcarriers are not orthogonalized sufficiently, occurrence of inter-carrier interference can be suppressed, data transmission can be performed with an excellent communication quality, and the multi-user diversity effect can be obtained.

Further, because interference between transmission carriers in the channel estimation signal is suppressed, a highly accurate channel estimation result can be obtained.

Fifth Embodiment

A fifth embodiment is explained next. FIG. 14 is a configuration example of the communication system according to the fifth embodiment, and is a configuration example of the uplink system in the OFDMA system that performs one-to-many two-way communication as in the fourth embodiment.

The communication system is different from that of the fourth embodiment, and the respective mobile stations include a source-control instructing unit (corresponding to the source-control instructing units 5-1, . . . , 5-N) and a multiple access controller (corresponding to multiple access controllers 8-1, . . . , 8-N), and the respective mobile stations further include a source-quality estimating unit (corresponding to the destination-quality estimating units 7-1, . . . , 7-N). On the other hand, the base station includes the demodulator 3 and the quality-estimating signal generator 6. The multiple access controller and the source-control instructing unit operate as a number-of-null carriers determining unit in claim 21. Only parts different from the fourth embodiment will be explained below.

In the present embodiment, as in the system according to the third embodiment, the mobile station (corresponding to the transmitting station in the third embodiment) estimates the reception quality of the signal in the base station (corresponding to the receiving station in the third embodiment), and determines the number of multiple accesses and the transmission format based on the estimation result.

Specifically, the quality-estimating signal generator 6 in the base station generates a quality-estimating signal used by the respective mobile stations for estimating the reception quality of the signal in the base station, and the base station transmits the quality-estimating signal to the respective mobile stations. The destination-quality estimating unit in the respective mobile stations estimates the reception quality of the signal in the base station by using the received quality-estimating signal. In the case of the system using the TDD system, the quality-estimating signal generator 6 transmits a signal having the same band as that of the signal transmitted by all the transmitting stations as the quality-estimating signal. In the case of the system using the FDD system, the quality-estimating signal generator 6 transmits, by return, the signal having received from the mobile station as the quality-estimating signal.

Next, the multiple access controllers in the respective mobile stations regard the quality estimation result by the destination-quality estimating unit as a signal reception-quality measurement result (source quality) by the base station, and determines the number of multiple accesses and the subcarrier arrangement based on the quality estimation result. As one example, if a contention-based connection is assumed, when the source quality is high (when it is assumed that the reception quality in the base station is excellent), the multiple access controller increases transmission probability of data with respect to the base station (for example, the number of data transmissions done per unit time). As a result, the number of mobile stations that perform the data transmission to the base station (corresponding to the number of multiple accesses) is appropriately changed based on the source quality, and the number of multiple accesses can be set high as compared with a case that the mobile station performs the data transmission by using fixed transmission probability. The multiple access controller determines the subcarrier to be used by the own station so that the source quality becomes high. Accordingly, the multi-user diversity effect can be obtained.

An operation for suppressing occurrence of interference at the time of transmitting the data by the system of the present embodiment is the same as that of the fourth embodiment.

In the present embodiment, the mobile station uses the quality-estimating signal transmitted by the base station to estimate the signal reception quality in the base station, and determines the number of multiple accesses, the subcarrier arrangement, and the transmission format based on the estimated signal reception quality. Accordingly, even under conditions where the respective users and the subcarriers are not orthogonalized sufficiently, occurrence of inter-carrier interference can be suppressed, data transmission can be performed with an excellent communication quality, and in the contention based connection, the multi-user diversity effect can be obtained by performing autonomous decentralized control of the number of multiple accesses by the respective mobile stations.

Because the source-control instructing signal and the reception quality signal to be transmitted from the base station to the mobile station are not required, the information to be transmitted from the base station to the mobile station can be reduced, and specifically, when the present embodiment is applied to the TDD system, the information to be transmitted from the base station to the mobile station can be largely reduced.

Because interference between transmission carriers in the channel estimation signal is suppressed, a highly accurate channel estimation result can be obtained.

Sixth Embodiment

Figure 15:
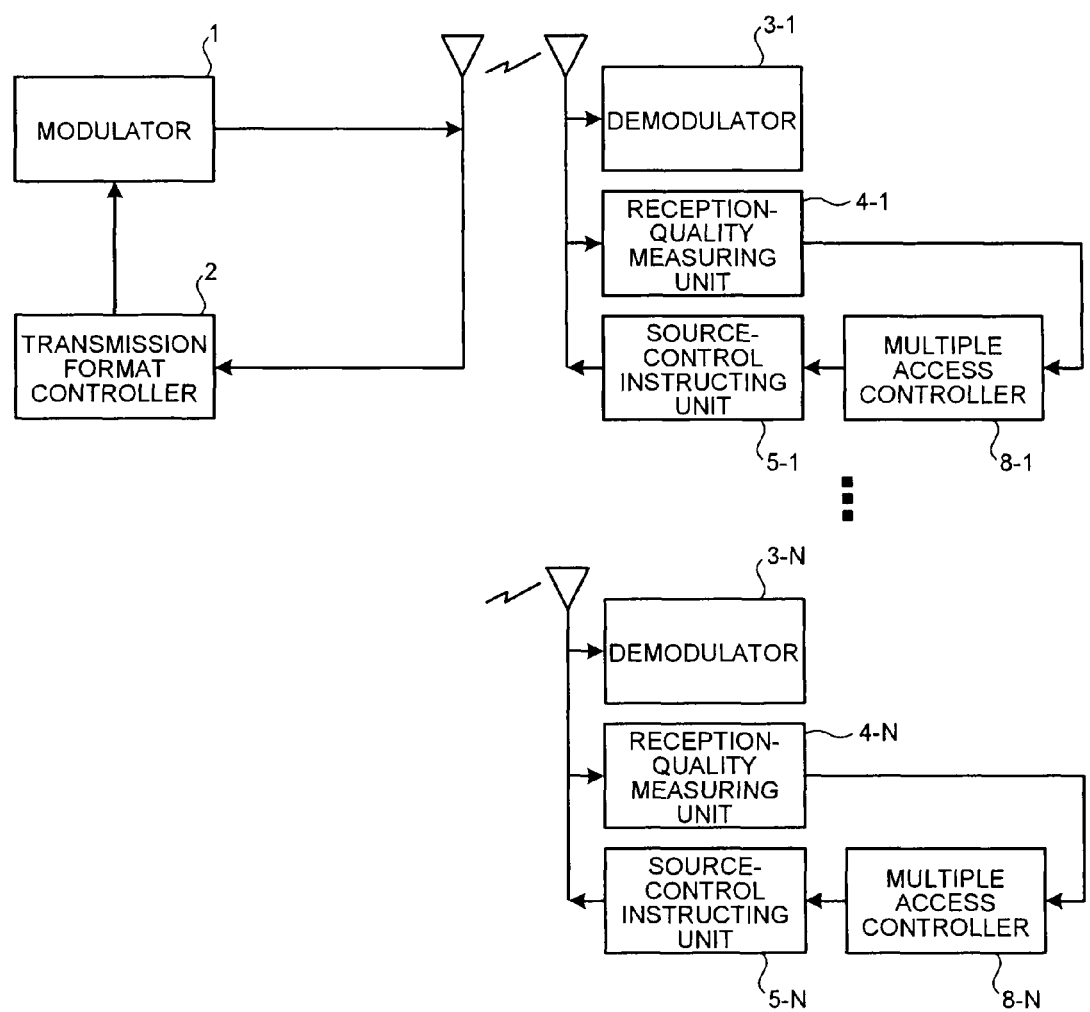
FIG. 15 is a configuration example of the communication system according to a sixth embodiment.

A sixth embodiment is explained next. FIG. 15 is a configuration example of the communication system according to the sixth embodiment, and is a configuration example of a downlink system of the OFDMA system that performs one-to-many two-way communication, that is, a downlink system in which one base station (transmitting station) transmits data and a plurality of mobile stations (receiving stations) receives the data.

The base station in the communication system includes the modulator 1 and the transmission format controller 2. The mobile station includes the demodulator (corresponding to the demodulators 3-1, . . . , 3-N), the reception-quality measuring unit (corresponding to the reception-quality measuring units 4-1, . . . , 4-N), the source-control instructing unit (corresponding to the source-control instructing units 5-1, . . . , 5-N), and the multiple access controller (corresponding to the multiple access controllers 8-1, . . . , 8-N). The multiple access controller and the source-control instructing unit operate as a number-of-null carriers determining unit in claim 17.

In the system of the present embodiment, the multiple access controller is added to the transmitting station (mobile station) in the first embodiment, so that the transmitting stations can simultaneously connect to the receiving station. Only parts different from the first embodiment will be explained below.

In the system of the present embodiment, the multiple access controller in each mobile station determines the number of multiple accesses and the subcarrier arrangement based on the reception quality of the received signal from the base station measured by the reception-quality measuring unit. As one example of operation, the multiple access controller arranges data addressed to the own station only in the subcarrier having the reception quality higher than a certain threshold. The threshold is adjusted according to a multiple access load. The source-control instructing unit determines the transmission format to be used by the base station at the time of transmitting data to the own station, and generates a source-control instructing signal including the information of the determined transmission format and the information of the subcarrier arrangement determined by the multiple access controller. The base station having received the source-control instructing signal from each mobile station uses the transmission format instructed by the source-control instructing signal and the subcarrier to transmit data. When a plurality of mobile stations instructs the same subcarrier, the transmission format controller adjusts the subcarrier to be used.

An operation example for suppressing occurrence of interference at the time of data transmission by the OFDMA system according to the present embodiment is explained with reference to FIGS. 16-1 to 16-3 and FIGS. 17-1 and 17-2.

Figures 1, 16:
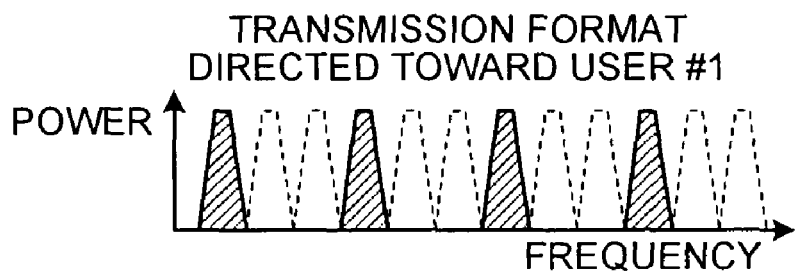
Figures 2, 16:
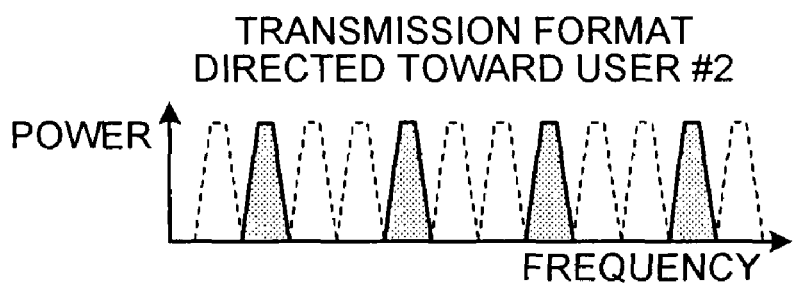
Figures 3, 16:
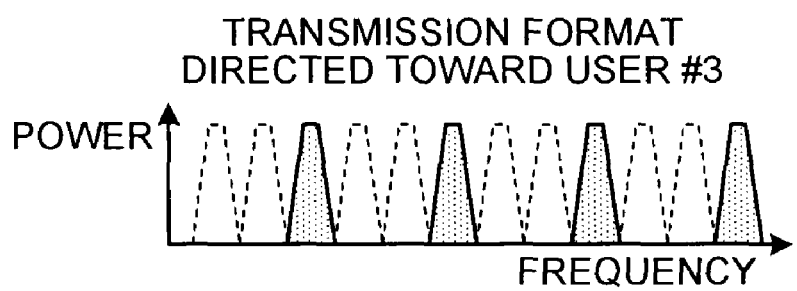

FIGS. 16-1 to 16-3 are transmission format examples to be used by the OFDMA system in which subcarriers are allocated to three users. The system allocates four transmission subcarriers to three users (users #1 to #3). For simplifying the explanation, it is assumed here that the transmission format is only one type.

Figures 1, 17:
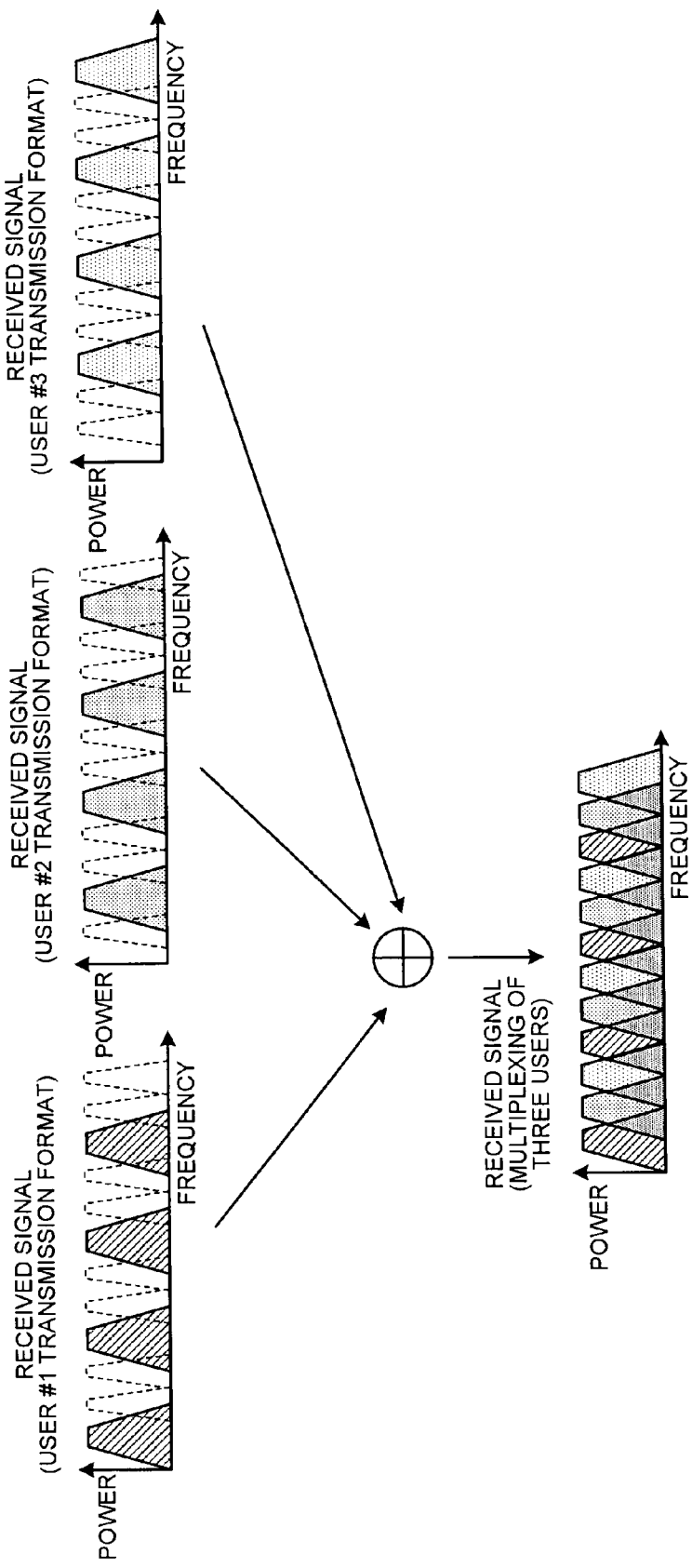

FIGS. 17-1 and 17-2 respectively depict an example of a state of inter-carrier interference when the base station transmits data of a plurality of users, and depict a state of inter-carrier interference when subcarriers with an expanded band due to nonlinear distortions or the like are multiplexed.

In the state where such inter-carrier interference has occurred, if the base station performs data transmission by multiplexing three users according to the OFDMA, inter-code interference occurs between all subcarriers, thereby largely deteriorating the characteristic (see FIG. 17-1).

On the other hand, when only two users (users #1 and #3) are multiplexed to perform data transmission, without multiplexing a signal directed to user #2, the subcarriers toward user #2 are not transmitted, and can be handled as the null carrier (see FIG. 17-2).

Thus, inter-carrier interference is suppressed by applying the GB-FEQ explained in the first embodiment in the state where two users are multiplexed. Specifically, the demodulator in users #1 and #3 equalizes the subcarriers directed toward user #2 as the null carrier, i.e., as guard band by the GB-FEQ, thereby enabling to suppress the inter-carrier interference remaining when two users are multiplexed. Therefore, data transmission can be performed with an excellent communication quality in which no interference occurs finally.

Thus, in the present embodiment, respective mobile stations determine the number of multiple accesses, the subcarrier arrangement, and the transmission format based on the reception quality of the signal received from the base station, and instruct the base station to transmit data according to the determined content, and the base station controls the number of null carriers to be inserted into the subcarrier group forming the transmission signal. Accordingly, even under conditions where the respective users and the subcarriers are not orthogonalized sufficiently, occurrence of inter-carrier interference can be suppressed, data transmission can be performed with an excellent communication quality, and the multi-user diversity effect can be obtained.

Further, because interference between transmission carriers in the channel estimation signal is suppressed, a highly accurate channel estimation result can be obtained.

Seventh Embodiment

Figure 18:
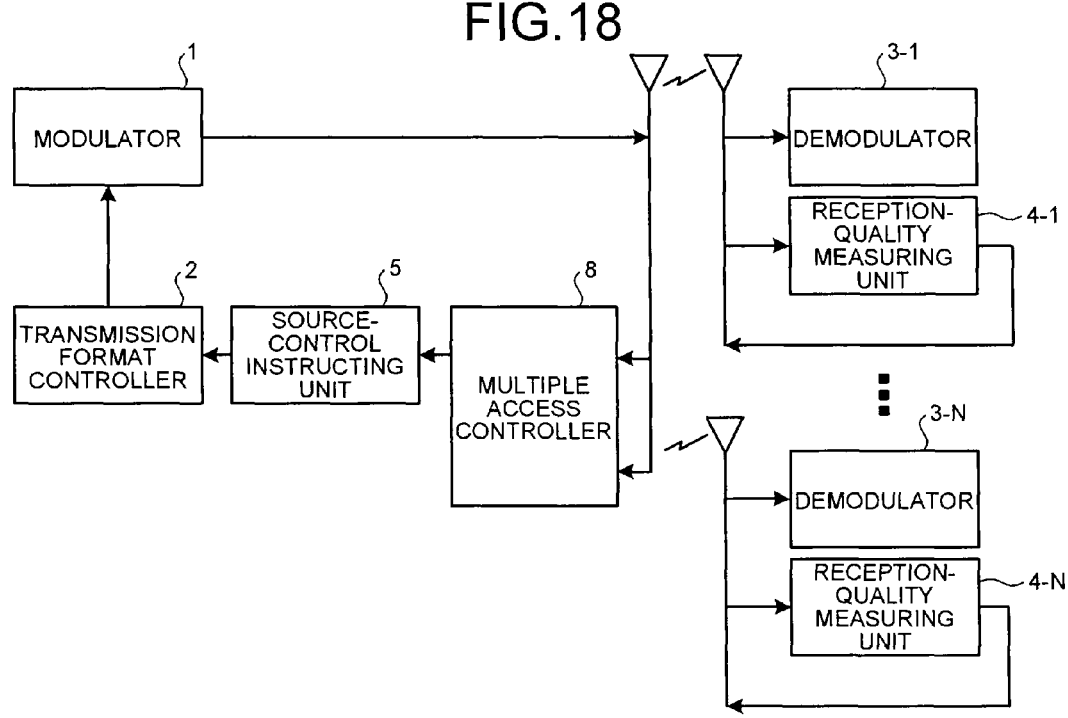
FIG. 18 is a configuration example of the communication system according to a seventh embodiment.

A seventh embodiment is explained next. FIG. 18 is a configuration example of the communication system according to the seventh embodiment, and is a configuration example of a downlink system of the OFDMA system that performs one-to-many two-way communication as in the sixth embodiment.

The base station in the communication system includes the modulator 1, the transmission format controller 2, the source-control instructing unit 5, and the multiple access controller 8. The mobile station includes the demodulator (corresponding to the demodulators 3-1, . . . , 3-N) and the reception-quality measuring unit (corresponding to the reception-quality measuring units 4-1, . . . , 4-N). The source-control instructing unit 5 and the multiple access controller 8 operate as a number-of-null carriers determining unit in claim 19. Only parts different from the sixth embodiment will be explained below.

In the communication system according to the present embodiment, the mobile station notifies the base station of the reception quality information of the signal received from the base station. The multiple access controller 8 in the base station determines the number of multiple accesses and the subcarrier arrangement based on the quality information, and the source-control instructing unit 5 determines the transmission format.

The operation performed by the system of the present embodiment for suppressing occurrence of inter-carrier interference at the time of data transmission is the same as that of the sixth embodiment. Further, in the present embodiment, at the time of performing the multiple access control and subcarrier allocation (subcarrier arrangement and determination of the transmission format), the base station can use the reception quality in all mobile stations as prior information. Therefore, the base station can perform centralized control over the number of multiple accesses, the subcarrier arrangement, and the transmission format, and therefore a more highly efficient system can be constructed as compared with the sixth embodiment.

As described above, in the present embodiment, the base station determines the number of multiple accesses, the subcarrier arrangement, and the transmission format based on the reception quality of the signal transmitted from the mobile station, and transmits data according to the determined content. Therefore, even under conditions where the respective users and the subcarriers are not orthogonalized sufficiently, occurrence of inter-carrier interference can be suppressed, data transmission can be performed with an excellent communication quality, and the multi-user diversity effect can be obtained.

Further, because interference between transmission carriers in the channel estimation signal is suppressed, a highly accurate channel estimation result can be obtained.

Eighth Embodiment

Figure 19:
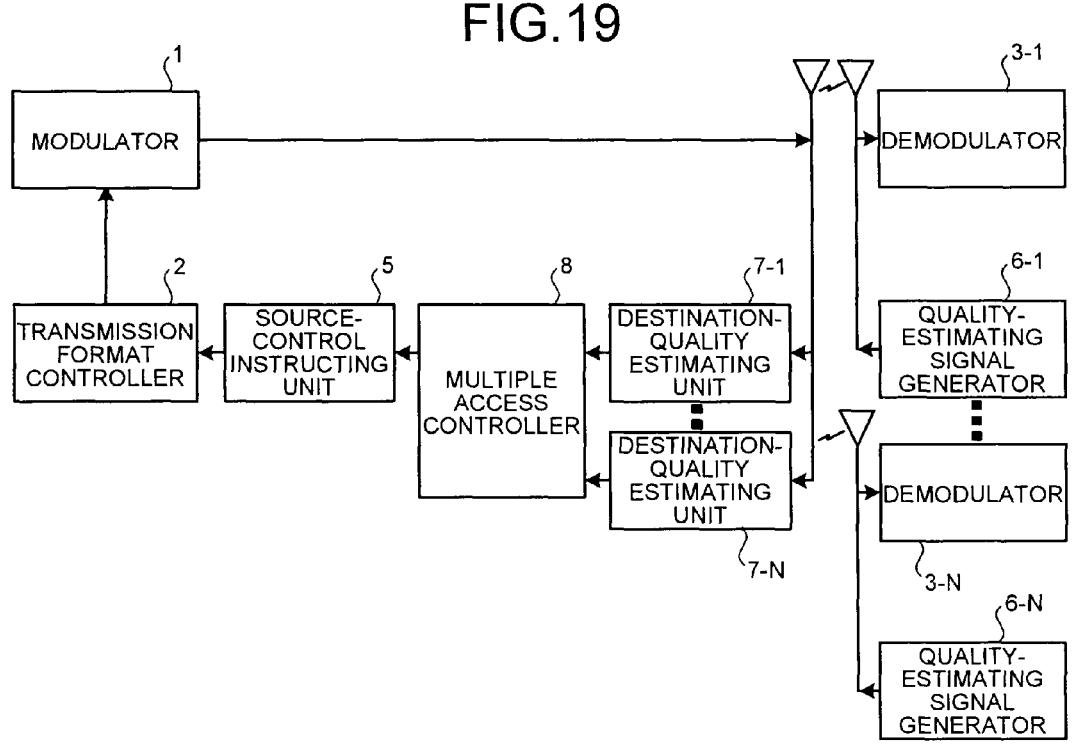
FIG. 19 is a configuration example of the communication system according to an eighth embodiment.

An eighth embodiment is explained next. FIG. 19 is a configuration example of the communication system according to the eighth embodiment, and is a configuration example of a downlink system of the OFDMA system that performs one-to-many two-way communication as in the sixth embodiment.

The base station in the communication system includes the modulator 1, the transmission format controller 2, the source-control instructing unit 5, the multiple access controller 8, and the destination-quality estimating units 7-1 to 7-N that operate as a reception-quality estimating unit in claim 22. The mobile station includes the demodulator (corresponding to the demodulators 3-1, . . . , 3-N) and a quality-estimating signal generator (corresponding to quality-estimating signal generators 6-1, . . . , 6-N). The source-control instructing unit 5 and the multiple access controller 8 operate as a number-of-null carriers determining unit in claim 22. Only parts different from the sixth embodiment will be explained.

In the system according to the present embodiment, the base station as the transmitting station determines the number of multiple accesses, the subcarrier arrangement, and the transmission format. Only parts different from the seventh embodiment will be explained below.

The base station in the present embodiment uses the quality-estimating signal transmitted from the respective mobile stations to estimate the reception quality of the signal in the respective mobile stations, and determines the number of multiple accesses, the subcarrier arrangement, and the transmission format based on the estimation result.

Specifically, the quality-estimating signal generator in each mobile station generates a quality-estimating signal to be used by the base station for estimating the reception quality of the signal in the mobile station. The respective destination-quality estimating units in the base station use the quality-estimating signal generated by the quality-estimating signal generator in each mobile station, to estimate the reception quality of the signal in a source mobile station of the quality-estimating signal. As the quality-estimating signal, in the case of the system using the TDD system, the mobile station transmits a signal having the same band as that of the signal transmitted by the base station as the quality-estimating signal. In the case of the system using the FDD system, the mobile station transmits, by return, the signal having received from the base station as the quality-estimating signal.

The multiple access controller 8 and the source-control instructing unit 5 in the base station regards the quality estimation result by the respective destination-quality estimating units as a signal reception-quality measurement result by each mobile station, to perform the same operation as that in the seventh embodiment, thereby determining the number of multiple accesses, the subcarrier arrangement, and the transmission format.

Thus, in the present embodiment, the base station uses the quality-estimating signal transmitted from the mobile stations to estimate the reception quality of the signal in the mobile stations, and determines the number of multiple accesses, the subcarrier arrangement, and the transmission format based on the estimated signal reception quality. Accordingly, even under conditions where the respective users and the subcarriers are not orthogonalized sufficiently, inter-carrier interference can be suppressed and data transmission can be performed with an excellent communication quality.

Furthermore, because the source-control instructing signal and the reception quality signal to be transmitted from the mobile station to the base station are not required, the information to be transmitted from the mobile station to the base station can be reduced, and specifically, when the present embodiment is applied to the TDD system, the information to be transmitted from the mobile station to the base station can be largely reduced.

Further, because interference between transmission carriers in the channel estimation signal is suppressed, a highly accurate channel estimation result can be obtained.

Ninth Embodiment

Figure 20:
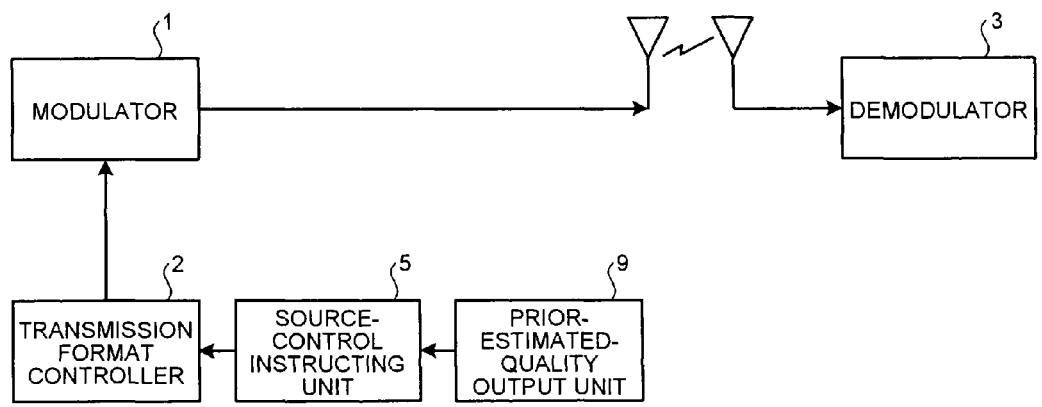
FIG. 20 is a configuration example of the communication system according to a ninth embodiment.

A ninth embodiment is explained next. FIG. 20 is a configuration example of the communication system according to the ninth embodiment, and is a configuration example of the OFDM system that performs one-to-one two-way communication as in the first to third embodiments. The transmitting station in the communication system includes the modulator 1, the transmission format controller 2, the source-control instructing unit 5, and a prior-estimated-quality output unit 9. On the other hand, the receiving station includes only the demodulator 3.

In the communication system according to the present embodiment, the transmitting station determines the transmission format to be used based on the signal reception quality in the receiving station estimated by the transmitting station, as in the third embodiment. However, it is different from the third embodiment in that the information transmitted from the receiving station is not required. Only parts different from the third embodiment will be explained below.

The prior-estimated-quality output unit 9 stores the signal reception quality in the receiving station estimated beforehand, and outputs the stored signal reception quality when the transmitting station performs data transmission. The prior-estimated-quality output unit 9 stores destination-reception quality information (signal reception quality) informed beforehand at the time of designing a cell, at the time of installing the cell, by calibration executed regularly, by a signal transmitted to a plurality of frames such as super frame, or the like. Accordingly, the communication system of the present embodiment realizes a shared reception quality between the transmitting station and the receiving station. The source-control instructing unit 5 regards an output signal from the prior-estimated-quality output unit 9 as a signal reception quality measurement result by the receiving station, to perform the same operation as that in the third embodiment.

In the present embodiment, a configuration example in which the prior-estimated-quality output unit is applied to the OFDM system that performs one-to-one two-way communication is shown. However, the present invention is not limited thereto, and the prior-estimated-quality output unit can be applied to the OFDMA system that performs one-to-many two-way communication explained in the fourth to eighth embodiments. Specifically, destination-reception quality information (signal reception quality) stored in the prior-estimated-quality output unit is regarded as the signal reception quality in the receiving station, and the operation same as that in the first to eighth embodiments can be performed by using this information.

Thus, in the present embodiment, the transmitting station determines the transmission format to be used based on the signal reception quality in the receiving station estimated beforehand and stored, thereby enabling to control the number of null carriers inserted into the subcarrier group forming the transmission signal. Accordingly, even under conditions where the respective users and the subcarriers are not orthogonalized sufficiently, inter-carrier interference can be suppressed and data transmission can be performed with an excellent communication quality.

Furthermore, when the transmitting station determines the transmission format, the receiving station need not transmit the information to the transmitting station. Therefore, the information transmitted from the mobile station to the base station can be reduced.

Further, because interference between transmission carriers in the channel estimation signal is suppressed, a highly accurate channel estimation result can be obtained.

Tenth Embodiment

Figure 21:
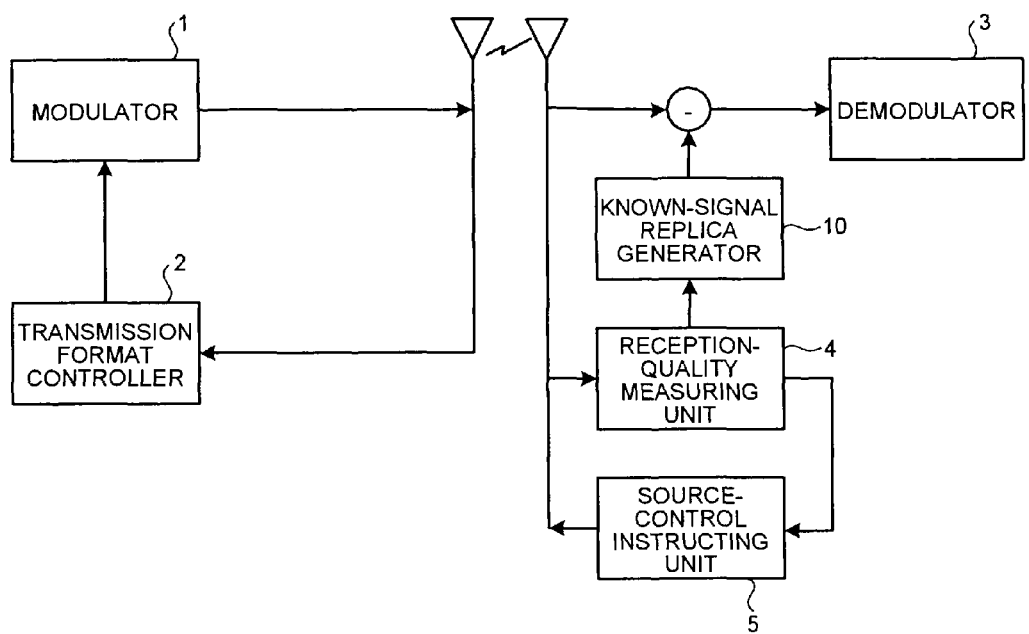
FIG. 21 is a configuration example of the communication system according to a tenth embodiment.

A tenth embodiment is explained next. FIG. 21 is a configuration example of the communication system according to the tenth embodiment, and is a configuration example of the OFDM system that performs one-to-one two-way communication as in the first to third embodiments. The transmitting station in the communication system includes the modulator 1 and the transmission format controller 2. On the other hand, the receiving station includes the demodulator 3, the reception-quality measuring unit 4, the source-control instructing unit 5, and a known-signal replica generator 10.

In the communication system according to the present embodiment, the receiving station determines the transmission format to be used by the transmitting station, based on the reception quality of the signal transmitted from the transmitting station, as in the first embodiment. However, it is different from the first embodiment in that a known signal is arranged in the transmission format instead of the null carrier. Only parts different from the first embodiment will be explained below.

The known-signal replica generator 10 generates a known signal component (hereinafter, "known replica signal") in the reception signal based on the reception quality signal (the reception quality of the signal transmitted from the transmitting station). For example, when the CIR is used as the reception quality signal, the known replica signal is generated by executing convolution of a known signal sequence and the CIR. The receiving station can remove the influence of the known signal included in the received signal by subtracting the known replica signal from the received signal. That is, because the known-signal replica generator 10 is added, the receiving station can convert a known signal subcarrier to the null carrier. The known signal means a general signal in which transmission data is known on the receiving station side, such as a pilot signal and a preamble signal.

Figures 1, 22:
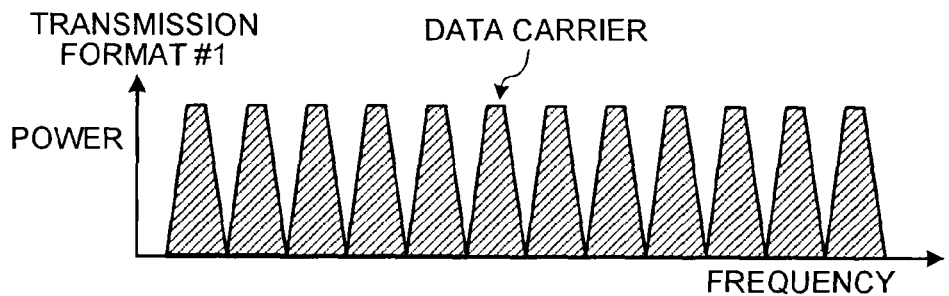
Figures 2, 22:
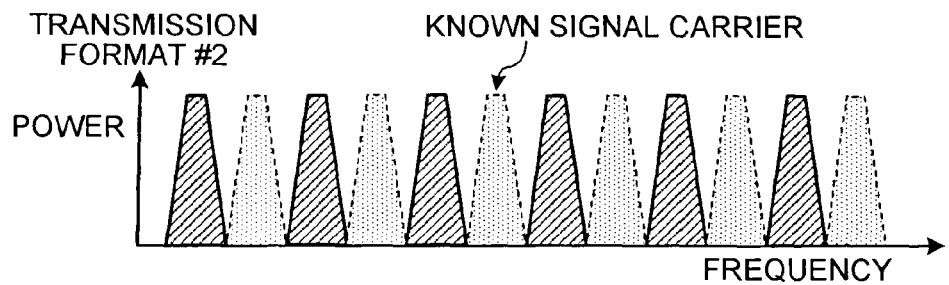
Figures 3, 22:
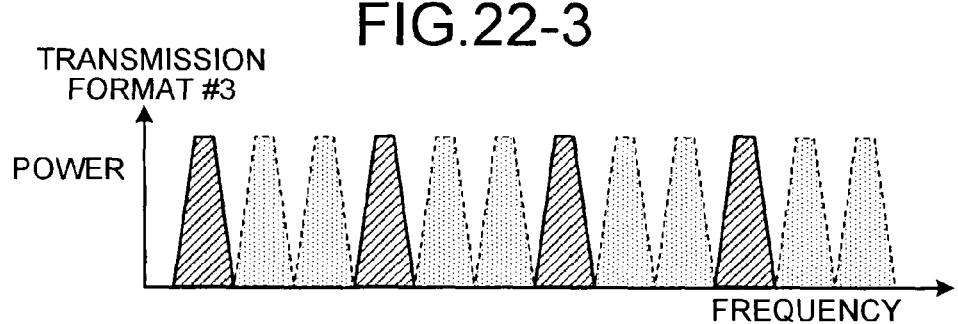
Figures 4, 22:
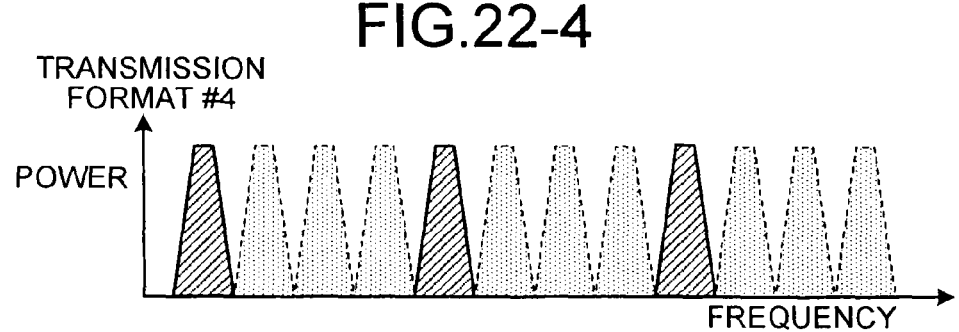

An operation example for suppressing occurrence of inter-carrier interference at the time of data transmission in the communication system according to the present embodiment is explained next with reference to FIG. 21 and FIGS. 22-1 to 22-4. FIGS. 22-1 to 22-4 are transmission format examples used in the tenth embodiment, in which the null carrier in the transmission format (see FIGS. 2-1 to 2-4) used in the first embodiment is replaced by a known signal carrier.

By performing the same operation as that in the first embodiment, the receiving station determines the transmission format to be used by the transmitting station, and the transmitting station uses the transmission format to transmit data to the receiving station. In the transmission format to be used at this time, the known signal carrier is arranged instead of the null carrier. The receiving station converts the known signal carrier included in the received signal to the null carrier by subtracting the known replica signal generated by the known-signal replica generator 10 from the received signal, and then performs the demodulation process.

In the present embodiment, a configuration example in which the known-signal replica generator is applied to the receiving station in the OFDM system that performs one-to-one two-way communication is shown. However, the present invention is not limited thereto, and the known-signal replica generator can be also applied to the receiving station in the OFDMA system that performs one-to-many two-way communication. That is, in the first to ninth embodiments, by applying the known-signal replica generator thereto, the transmission format in which the known carrier is used instead of the null carrier can be used.

Thus, in the present embodiment, the receiving station of data generates the known signal component based on the reception quality of the signal received from the transmitting station, and performs the demodulation process after having converted the known signal subcarrier included in the received signal to the null carrier by subtracting a known component signal from the received signal. Accordingly, the first to ninth embodiments can be realized by using the known signal subcarrier instead of the null carrier, and even when the known signal subcarrier is used, the same effect as those in the first to ninth embodiments can be obtained.

INDUSTRIAL APPLICABILITY

As described above, the communication control method according to the present invention is useful for a communication system corresponding to the multicarrier modulation method, and specifically, suitable for a communication system in which interference between subcarriers is suppressed to perform data transmission.

The invention claimed is:

1. A method for a receiving station to control a number of carriers included in a transmission signal transmitted by a transmitting station in a communication system adopting a multicarrier modulation system to suppress inter-carrier interference, the method comprising:
    reception-quality measuring including the receiving station measuring a reception quality of a subcarrier group forming the transmission signal; and
    number-of-known carriers determining including the receiving station determining one of a number of predetermined sets of known carriers to be included among a subcarrier group of a next transmission signal based on the reception quality measured at the reception-quality measuring, the predetermined sets of known carriers each including a different respective pattern of known carriers to be included among the subcarrier group of the next transmission signal.

2. The method according to claim 1, wherein
    the communication system includes a plurality of transmitting stations,
    the reception-quality measuring further includes the receiving station measuring a reception quality of a subcarrier group of a transmission signal transmitted from each of the plurality of transmitting stations, and the number-of-known carriers determining further includes the receiving station determining, for each of the plurality of transmitting stations and based on each reception quality measured at the reception-quality measuring, a subcarrier group to be allocated to a transmitting station of the plurality of transmitting stations at a time of next transmission, an arrangement of the subcarrier group to be allocated to the transmitting station of the plurality of transmitting stations, and one of the number of predetermined sets of known carriers to be included among the subcarrier group to be allocated to the transmitting station of the plurality of transmitting stations.

3. The method according to claim 1, wherein the communication system includes a plurality of receiving stations, the reception-quality measuring further includes each of the plurality of receiving stations measuring a reception quality of the subcarrier group forming the transmission signal, and the number-of-known carriers determining further includes, for each of the plurality of receiving stations, determining an arrangement of a subcarrier group of a next transmission signal to be transmitted to a receiving station of the plurality of receiving stations based on a reception quality measured at the receiving station, and determining one of the number of predetermined sets of known carriers to be included among the subcarrier group of the next transmission signal to be transmitted to the receiving station of the plurality of receiving stations based on the reception quality measured at the receiving station.

4. The method according to claim 1, further comprising prior-estimated-reception quality obtaining including obtaining a prior-estimated reception quality of the subcarrier group forming the transmission signal which has been estimated and stored in advance, wherein the number-of-known carriers determining further includes the receiving station determining the one of the number of predetermined sets of known carriers to be included among the subcarrier group of the next transmission signal based on the prior-estimated reception quality instead of the reception quality measured at the reception-quality measuring.

5. The method according to claim 1, further comprising known-replica-signal generating including generating a known replica signal to be used for converting a known signal subcarrier to a null carrier; and removing the influence of the one set of known carriers from the next transmission signal by subtracting the influence of the one set of known carriers based on the known replica signal, to convert the one set of known carriers to null carriers.

6. A method for a transmitting station to control a number of carriers included in a transmission signal transmitted to a receiving station in a communication system adopting a multicarrier modulation system to suppress inter-carrier interference the method comprising:

receiving, from the receiving station, a reception quality of a subcarrier group forming the transmission signal, the reception quality being measured at the receiving station; and number-of-known carriers determining including the transmitting station determining one of a number of predetermined sets of known carriers to be included among a subcarrier group of a next transmission signal based on the reception quality received from the receiving station, the predetermined sets of known carriers each including a respective different pattern of known carriers to be included among the subcarrier group of the next transmission signal.

7. The method according to claim 6, wherein the communication system includes a plurality of receiving stations, the receiving further includes receiving a reception quality of the subcarrier group forming the transmission signal from each of the plurality of receiving stations, and the number-of-known carriers determining further includes the transmitting station determining, for each of the plurality of receiving stations and based on each reception quality received at the receiving, a subcarrier group to be allocated to a receiving station of the plurality of receiving stations at a time of next transmission, an arrangement of the subcarrier group to be allocated to the receiving station of the plurality of receiving stations, and one of the number of predetermined sets of known carriers to be included among the subcarrier group to be allocated to the receiving station of the plurality of receiving stations.

8. The method according to claim 6, further comprising prior-estimated-reception quality obtaining including obtaining a prior-estimated reception quality of the subcarrier group forming the transmission signal which has been estimated and stored in advance, wherein the number-of-known carriers determining further includes the transmitting station determining the one of the number of predetermined sets of known carriers to be included among the subcarrier group of the next transmission signal based on the prior-estimated reception quality instead of the reception quality received at the receiving.

9. The method according to claim 6, further comprising known-replica-signal generating including generating a known replica signal to be used for converting a known signal subcarrier to a null carrier; and including the known replica signal among the subcarrier group of the next transmission signal.

10. A method for a transmitting station to control a number of carriers included in a transmission signal transmitted to a receiving station in a communication system adopting a multicarrier modulation system to suppress inter-carrier interference, the method comprising:

receiving, from the receiving station, a quality-estimating signal of a subcarrier group forming the transmission signal, the quality-estimating signal being measured at the receiving station;

reception-quality estimating including the transmitting station estimating a reception quality of the subcarrier group forming the transmission signal based on the quality-estimating signal; and number-of-known carriers determining including the transmitting station determining one of a number of predetermined sets of known carriers to be included among a subcarrier group of a next transmission signal based on the reception quality estimated at the reception-quality estimating, the predetermined sets of known carriers each including a different respective pattern of known carriers to be included among the subcarrier group of the next transmission signal.

11. The method according to claim 10, wherein
the communication system includes a plurality of transmitting stations,
the reception-quality estimating further includes each of the plurality of transmitting stations estimating a reception quality of the subcarrier group forming the transmission signal, and
the number-of-known carriers determining further includes, for each of the plurality of transmitting stations,
  determining a number of executions of data transmission per unit time of a transmitting station of the plurality of transmitting stations, as a data transmission probability,
  determining an arrangement of a subcarrier group to be used at a time of next data transmission based on a reception quality measured at the transmitting station of the plurality of transmitting stations, and
  determining one of the number of predetermined sets of known carriers to be included among the subcarrier group to be used at the time of next data transmission based on the reception quality measured at the transmitting station of the plurality of transmitting stations.

12. The method according to claim 10, wherein
the communication system includes a plurality of receiving stations,
the receiving further includes receiving, from each of the plurality of receiving stations, a quality-estimating signal of the subcarrier group forming the transmission signal, each quality-estimating signal being measured at a respective one of the plurality of receiving stations,
the reception-quality estimating further includes the transmitting station estimating a reception quality of the subcarrier group forming the transmission signal for each of the plurality of receiving stations, each reception quality being based on the quality-estimating signal received from a respective one of the plurality of receiving stations, and
the number-of-known carriers determining further includes the transmitting station determining, for each of the plurality of receiving stations and based on each reception quality,
  a subcarrier group to be allocated to a receiving station of the plurality of receiving stations at a time of next transmission,
  an arrangement of the subcarrier group to be allocated to the receiving station of the plurality of receiving stations, and
  one of the number of predetermined sets of known carriers to be included among the subcarrier group to be allocated to the receiving station of the plurality of receiving stations.

13. The method according to claim 10, further comprising
prior-estimated-reception quality obtaining including obtaining a prior-estimated reception quality of the subcarrier group forming the transmission signal which has been estimated and stored in advance, wherein
the number-of-known carriers determining further includes the transmitting station determining the one of the number of predetermined sets of known carriers to be included among the subcarrier group of the next transmission signal based on the prior-estimated reception quality instead of the reception quality estimated at the reception-quality estimating.

14. The method according to claim 10, further comprising
known-replica-signal generating including generating a known replica signal to be used for converting a known signal subcarrier to a null carrier; and
including the known replica signal among the subcarrier group of the next transmission signal.

15. A receiving station apparatus that controls a number of null carriers included in a transmission signal transmitted by a transmitting station apparatus in a communication system adopting a multicarrier modulation system to suppress inter-carrier interference, the receiving station apparatus comprising:
  a reception-quality measuring unit that measures a reception quality of a subcarrier group forming the transmission signal; and
  a number-of-known carriers determining unit that determines one of a number of predetermined sets of known carriers to be included among a subcarrier group of a next transmission signal based on the reception quality, the predetermined sets of known carriers each including different a respective pattern of known carriers to be included among the subcarrier group of the next transmission signal.

16. The receiving station apparatus according to claim 15, wherein
the communication system includes a plurality of transmitting station apparatuses,
the reception-quality measuring unit further measures a reception quality of a subcarrier group of a transmission signal transmitted from each of the plurality of transmitting station apparatuses, and
the number-of-known carriers determining unit further determines, for each of the plurality of transmitting station apparatuses and based on each reception quality measured by the reception-quality measuring unit,
  a subcarrier group to be allocated to a transmitting station apparatus of the plurality of transmitting station apparatuses at a time of next transmission,
  an arrangement of the subcarrier group to be allocated to the transmitting station apparatus of the transmitting station apparatuses, and
  one of the number of predetermined sets of known carriers to be included among the subcarrier group to be allocated to the transmitting station apparatus of the plurality of transmitting station apparatuses.

17. The receiving station apparatus according to claim 15, wherein the number-of-known carriers determining unit further determines an arrangement of the subcarrier group in the next transmission signal transmitted from the transmitting station apparatus and the one of the number of predetermined sets of known carriers to be included among the subcarrier group based on the reception quality obtained as a measurement result of the reception-quality measuring unit.

18. A transmitting station apparatus that controls a number of carriers included in a transmission signal transmitted to a receiving station apparatus in a communication system adopting a multicarrier modulation system to suppress inter-carrier interference, the transmitting station apparatus comprising:
  a receiving unit that receives a reception quality of a subcarrier group forming the transmission signal, the reception quality being measured by the receiving station apparatus; and
  a number-of-known carriers determining unit that determines one of a number of predetermined sets of known carriers to be included among a subcarrier group of a next transmission signal based on the reception quality received from the receiving station apparatus, the predetermined sets of known carriers each including a respective different pattern of known carriers to be included among the subcarrier group of the next transmission signal.

19. The transmitting station apparatus according to claim 18, wherein
the communication system includes a plurality of receiving station apparatuses,
the receiving unit further receives a reception quality of the subcarrier group forming the transmission signal from each of the plurality of receiving station apparatuses, and
the number-of-known carriers determining unit further determines, for each of the plurality of receiving station apparatuses and based on each reception quality received by the receiving unit,
a subcarrier group to be allocated to a receiving station apparatus of the plurality of receiving station apparatuses at a time of next transmission,
an arrangement of the subcarrier group to be allocated to the receiving station apparatus of the plurality of receiving station apparatuses, and
one of the number of predetermined sets of known carriers to be included among the subcarrier group to be allocated to the receiving station apparatus of the plurality of receiving station apparatuses.

20. A transmitting station apparatus that controls a number of carriers included in a transmission signal transmitted to a receiving station apparatus in a communication system adopting a multicarrier modulation system to suppress inter-carrier interference, the transmitting station apparatus comprising:
a receiving unit that receives a quality-estimating signal of a subcarrier group forming the transmission signal, the quality-estimating signal being measured at the receiving station apparatus;
a reception-quality estimating unit that estimates a reception quality of the subcarrier group forming the transmission signal based on the quality-estimating signal; and
a number-of-known carriers determining unit that determines one of a number of predetermined sets of known carriers to be included among a subcarrier group of a next transmission signal based on the reception quality estimated by the reception-quality estimating unit, the predetermined sets of known carriers each including a different respective pattern of known carriers to be included among the subcarrier group of the next transmission signal.

21. The transmitting station apparatus according to claim 20, wherein
the number-of-known carriers determining unit further determines a number of executions of data transmission per unit time, as a data transmission probability, an arrangement of the subcarrier group to be allocated for a time of next data transmission based on the estimated reception quality, and one of the number of predetermined sets of known carriers to be included among the subcarrier group based on the reception quality estimated by the reception-quality estimating unit.

22. The transmitting station apparatus according to claim 20, wherein
the communication system includes a plurality of receiving station apparatuses,
the receiving unit further receives, from each of the plurality of receiving station apparatuses, a quality-estimating signal of the subcarrier group forming the transmission signal, each quality-estimating signal being measured at a respective one of the plurality of receiving station apparatuses,
the reception-quality estimating unit further estimates a reception quality of a subcarrier group forming the transmission signal for each of the plurality of receiving station apparatuses each reception quality being based on the quality-estimating signal received from a respective one of the plurality of receiving station apparatuses, and
the number-of-known carriers determining unit further determines, for each of the plurality of receiving station apparatuses and based on each reception quality,
a subcarrier group to be allocated to a receiving station apparatus of the plurality of receiving station apparatuses at a time of next transmission,
an arrangement of the subcarrier group to be allocated to the receiving station apparatus of the plurality of receiving station apparatuses, and
one of the number of predetermined sets of known carriers to be included among the subcarrier group to be allocated to the receiving station of the plurality of receiving stations.

23. A communication system that employs a multicarrier modulation system to suppress inter-carrier interference, the communication system comprising:
a receiving station apparatus that measures a reception quality of a subcarrier group forming a transmission signal to determine one of a number of predetermined sets of known carriers to be included among a subcarrier group of a next transmission signal based on the reception quality, the predetermined sets of known carriers each including a different respective pattern of known carriers to be included among the subcarrier group of the next transmission signal; and
a transmitting station apparatus that generates the transmission signal including the subcarrier group based on the one of the number of predetermined sets of known carriers to be included among the subcarrier group determined by the receiving station apparatus.

24. A communication system that employs a multicarrier modulation system to suppress inter-carrier interference, the communication system comprising:
a receiving station apparatus that measures a reception quality of a subcarrier group forming a transmission signal, and transmits the reception quality; and
a transmitting station apparatus that receives the reception quality of the subcarrier group measured by the receiving station apparatus, and determines one of a number of predetermined sets of known carriers to be included among a subcarrier group of a next transmission signal based on the reception quality, the predetermined sets of known carriers each including a different respective pattern of known carriers to be included among the subcarrier group of the next transmission signal.

25. A communication system that employs a multicarrier modulation system to suppress inter-carrier interference, the communication system comprising:
a receiving station apparatus that generates a quality-estimating signal for estimating a reception quality of a subcarrier group forming a transmission signal, and transmits the quality-estimating signal; and
a transmitting station apparatus that receives the quality-estimating signal generated by the receiving station apparatus, estimates a reception quality based on the quality-estimating signal, and determines one of a number of predetermined sets of known carriers to be included among a subcarrier group of a next transmission signal based on the reception quality, the predetermined sets of known carriers each including a different respective pattern of known carriers to be included among the subcarrier group of the next transmission signal.

* * * * *